US010291607B1

(12) United States Patent
Cifelli et al.

(10) Patent No.: US 10,291,607 B1

(45) Date of Patent: May 14, 2019

(54) PROVIDING REAL-TIME EVENTS TO APPLICATIONS

(71) Applicant: Wickr Inc., Chicago, IL (US)

(72) Inventors: Matthew Cifelli, Newark, NJ (US); Roy Hill-Percival, Weehawken, NJ (US)

(73) Assignee: Wickr Inc., Pleasanton, CA (US)

( * ) Notice: Subject to any disclaimer, the term of this patent is extended or adjusted under 35 U.S.C. 154(b) by 0 days.

(21) Appl. No.: 15/224,341

(22) Filed: Jul. 29, 2016

Related U.S. Application Data

(60) Provisional application No. 62/290,301, filed on Feb. 2, 2016, provisional application No. 62/318,657, filed on Apr. 5, 2016.

(51) Int. Cl.
*G06F 7/04* (2006.01)
*H04L 29/06* (2006.01)
*H04L 29/08* (2006.01)

(52) U.S. Cl.
CPC .......... *H04L 63/083* (2013.01); *H04L 63/102* (2013.01); *H04L 67/1002* (2013.01)

(58) Field of Classification Search
CPC ...... H04W 12/06; H04W 76/02; H04L 63/083
See application file for complete search history.

(56) References Cited

U.S. PATENT DOCUMENTS 5,850,443 A 12/1998 Van
5,953,419 A 9/1999 Lohstroh
6,009,173 A 12/1999 Sumner
6,091,820 A 7/2000 Aziz
6,112,227 A 8/2000 Heiner
6,145,079 A 11/2000 Mitty
6,263,435 B1 7/2001 Dondeti
6,266,420 B1 7/2001 Langford
6,314,190 B1 11/2001 Zimmermann
6,324,569 B1 11/2001 Ogilvie
6,393,464 B1 5/2002 Dieterman
6,405,315 B1 6/2002 Burns
6,457,134 B1 9/2002 Lemke
(Continued)

FOREIGN PATENT DOCUMENTS

EP 2018015 1/2009
WO 2011101784 8/2011
WO 2014140736 9/2014

OTHER PUBLICATIONS

Author Unknown, 'myENIGMA: Whitepaper', Qnective AG, 2013.
(Continued)

*Primary Examiner* — Samson B Lemma
*Assistant Examiner* — Arya Golriz
(74) *Attorney, Agent, or Firm* — LaForgia Law, P.C.

(57) ABSTRACT

The present disclosure describes systems and methods for an app provider to deliver information—such as notifications, alerts, messages, and other data—between client devices without the use of a third-party push token. When receivers are connected to the app provider system, the app provider will deliver a notification and the communication to the receivers without the use of a third-party push token. When receivers are not connected to the app provider system, the app provider may cache communications and notifications until the next time the receiver connects to the app provider.

15 Claims, 15 Drawing Sheets

(56) References Cited

U.S. PATENT DOCUMENTS

| | | | | |
|---|---|---|---|---|
| 6,463,155 | B1 | 10/2002 | Akiyama | |
| 6,463,460 | B1 | 10/2002 | Simonoff | |
| 6,463,463 | B1 | 10/2002 | Godfrey | |
| 6,711,608 | B1 | 3/2004 | Ogilvie | |
| 6,721,784 | B1 | 4/2004 | Leonard | |
| 6,742,116 | B1 | 5/2004 | Matsui | |
| 6,801,998 | B1 | 10/2004 | Hanna | |
| 6,804,257 | B1 | 10/2004 | Benayoun | |
| 6,851,049 | B1 | 2/2005 | Price, III | |
| 6,904,521 | B1 | 6/2005 | Jivsov | |
| 6,912,656 | B1 | 6/2005 | Perlman | |
| 6,947,556 | B1 | 9/2005 | Matyas | |
| 6,978,284 | B2 | 12/2005 | McBrearty | |
| 7,024,456 | B1 | 4/2006 | Simonoff | |
| 7,043,529 | B1 | 5/2006 | Simonoff | |
| 7,139,399 | B1 | 11/2006 | Zimmermann | |
| 7,149,893 | B1 | 12/2006 | Leonard | |
| 7,178,021 | B1 | 2/2007 | Hanna | |
| 7,197,537 | B2 | 3/2007 | Koch | |
| 7,243,231 | B2 | 7/2007 | Ellison | |
| 7,263,619 | B1 | 8/2007 | Kim | |
| 7,308,477 | B1 | 12/2007 | Gress | |
| 7,356,564 | B2 | 4/2008 | Hartselle | |
| 7,366,894 | B1 | 4/2008 | Kalimuthu | |
| 7,383,439 | B2 | 6/2008 | Price, III | |
| 7,526,620 | B1 | 4/2009 | McGovern | |
| 7,584,505 | B2 | 9/2009 | Mondri | |
| 7,640,427 | B2 | 12/2009 | Callas | |
| 7,657,037 | B2 | 2/2010 | Callas | |
| 7,711,120 | B2 | 5/2010 | Kimmel | |
| 7,715,565 | B2 | 5/2010 | Kimmel | |
| 7,730,309 | B2 | 6/2010 | Zimmermann | |
| 7,739,501 | B2 | 6/2010 | Kimmel | |
| 7,802,099 | B2 | 9/2010 | Mitchell | |
| 8,036,221 | B2 | 10/2011 | Fluhrer | |
| 8,156,536 | B2 | 4/2012 | Polk | |
| 8,175,277 | B2 | 5/2012 | Bell | |
| 8,291,031 | B1 | 10/2012 | Kirkham | |
| 8,347,083 | B1 | 1/2013 | Scudder | |
| 8,356,177 | B2 | 1/2013 | McGrew | |
| 8,364,764 | B2 | 1/2013 | Hartselle | |
| 8,364,984 | B2 | 1/2013 | Jeffries | |
| 8,379,857 | B1 | 2/2013 | Zheng | |
| 8,380,868 | B2 | 2/2013 | Hiie | |
| 8,407,471 | B1 | 3/2013 | Sobel | |
| 8,412,934 | B2 | 4/2013 | De Atley | |
| 8,429,420 | B1 | 4/2013 | Melvin | |
| 8,433,901 | B2 | 4/2013 | De Atley | |
| 8,392,699 | B2 | 5/2013 | Jones | |
| 8,447,970 | B2 | 5/2013 | Klein | |
| 8,478,893 | B2 | 7/2013 | Hiie | |
| 8,489,889 | B1 | 7/2013 | Moscaritolo | |
| 8,503,621 | B2 | 8/2013 | Patel | |
| 8,503,681 | B1 | 8/2013 | McGrew | |
| 8,510,552 | B2 | 8/2013 | De Atley | |
| 8,527,769 | B2 | 9/2013 | Kotla | |
| 8,560,843 | B1 | 10/2013 | Moscaritolo | |
| 8,566,350 | B2 | 10/2013 | Chow | |
| 8,572,757 | B1 | 10/2013 | Stamos | |
| 8,588,425 | B1 | 11/2013 | Harwood | |
| 8,589,673 | B2 | 11/2013 | Ackerly | |
| 8,589,680 | B2 | 11/2013 | De Atley | |
| 8,601,114 | B1 | 12/2013 | Blair | |
| 8,601,263 | B1 | 12/2013 | Shankar | |
| 8,625,805 | B1 | 1/2014 | Statica | |
| 8,631,227 | B2 | 1/2014 | Olechowski | |
| 8,667,271 | B2 | 3/2014 | Shkolnikov | |
| 8,677,136 | B2 | 3/2014 | Brokenshire | |
| 8,682,893 | B2 | 3/2014 | Summerlin | |
| 8,689,015 | B2 | 4/2014 | Jeffries | |
| 8,705,565 | B2 | 4/2014 | Kutt | |
| 8,713,311 | B1 | 4/2014 | Roskind | |
| 8,782,409 | B2 | 4/2014 | Murphy | |
| 8,719,233 | B2 | 5/2014 | Gandhi | |
| 8,726,009 | B1 | 5/2014 | Cook | |
| 8,726,369 | B1 | 5/2014 | Emigh | |
| 8,732,452 | B2 | 5/2014 | Byrum | |
| 8,756,419 | B2 | 6/2014 | De Atley | |
| 8,762,712 | B1 | 6/2014 | Kwan | |
| 8,788,842 | B2 | 7/2014 | Brouwer | |
| 8,788,899 | B2 | 7/2014 | Hiie | |
| 8,798,614 | B2 | 8/2014 | Bellovin | |
| 8,824,664 | B1 | 9/2014 | Ristock | |
| 8,837,739 | B1 | 9/2014 | Sexton | |
| 8,862,129 | B2 | 10/2014 | Moshir | |
| 8,863,226 | B1 | 10/2014 | Bailey, Jr. | |
| 8,874,902 | B2 | 10/2014 | Ackerly | |
| 8,913,994 | B2 | 12/2014 | Edwards | |
| 8,918,896 | B2 | 12/2014 | Murphy | |
| 8,925,109 | B2 | 12/2014 | Agrawal | |
| 8,938,810 | B2 | 1/2015 | Richardson | |
| 8,948,382 | B2 | 2/2015 | Hassan | |
| 8,948,391 | B2 | 2/2015 | Kritt | |
| 8,954,740 | B1 | 2/2015 | Moscaritolo | |
| 8,958,559 | B2 | 2/2015 | Medina | |
| 8,996,861 | B1 | 3/2015 | Cummings | |
| 9,027,114 | B2 | 5/2015 | Akhter | |
| 9,037,796 | B2 | 5/2015 | Nagpal | |
| 9,059,840 | B2 | 6/2015 | Connelly | |
| 9,071,597 | B2 | 6/2015 | Lord | |
| 9,075,638 | B2 | 7/2015 | Barnett | |
| 9,077,525 | B2 | 7/2015 | Chandran | |
| 9,078,127 | B2 | 7/2015 | Kritt | |
| 9,094,405 | B2 | 7/2015 | Buck | |
| 9,100,373 | B2 | 8/2015 | Deluca | |
| 9,124,559 | B2 | 9/2015 | Deluca | |
| 9,130,822 | B2 | 9/2015 | Cooper | |
| 9,137,191 | B2 | 9/2015 | Firstenberg | |
| 9,154,612 | B2 | 10/2015 | Moshir | |
| 9,197,616 | B2 | 11/2015 | Sinha | |
| 9,210,143 | B2 | 12/2015 | Ozzie | |
| 9,224,014 | B2 | 12/2015 | Rios | |
| 9,225,709 | B2 | 12/2015 | Ackerly | |
| 9,237,016 | B2 | 1/2016 | De Atley | |
| 9,264,406 | B2 | 2/2016 | Kipnis | |
| 9,282,192 | B2 | 3/2016 | Laasik | |
| 9,288,047 | B2 | 3/2016 | Brouwer | |
| 9,326,135 | B2 | 4/2016 | Rodrigues | |
| 9,380,044 | B2 | 6/2016 | Zhang | |
| 2001/0044901 | A1 | 11/2001 | Grawrock | |
| 2002/0002468 | A1 | 1/2002 | Spagna | |
| 2002/0026487 | A1 | 2/2002 | Ogilvie | |
| 2002/0037736 | A1 | 3/2002 | Kawaguchi | |
| 2002/0038296 | A1 | 3/2002 | Margolus | |
| 2002/0038421 | A1 | 3/2002 | Hamada | |
| 2002/0049671 | A1* | 4/2002 | Trende ................. | G06Q 20/102 705/40 |
| 2002/0078380 | A1 | 6/2002 | Lin | |
| 2002/0094085 | A1 | 7/2002 | Roberts | |
| 2002/0095465 | A1 | 7/2002 | Banks | |
| 2002/0154776 | A1 | 10/2002 | Sowa | |
| 2002/0166053 | A1 | 11/2002 | Wilson | |
| 2002/0186703 | A1 | 12/2002 | West et al. | |
| 2003/0021416 | A1 | 1/2003 | Brown | |
| 2003/0028597 | A1 | 2/2003 | Salmi | |
| 2003/0037114 | A1 | 2/2003 | Nishio | |
| 2003/0046533 | A1 | 3/2003 | Olkin | |
| 2003/0084050 | A1 | 5/2003 | Hall | |
| 2003/0084347 | A1 | 5/2003 | Luzzatto | |
| 2003/0126215 | A1 | 7/2003 | Udell | |
| 2003/0131060 | A1 | 7/2003 | Hartselle | |
| 2003/0191937 | A1 | 10/2003 | Balissat | |
| 2003/0204720 | A1 | 10/2003 | Schoen et al. | |
| 2003/0208686 | A1 | 11/2003 | Thummalapally | |
| 2003/0217266 | A1 | 11/2003 | Epp | |
| 2003/0229668 | A1 | 12/2003 | Malik | |
| 2004/0013113 | A1 | 1/2004 | Singh et al. | |
| 2004/0054891 | A1 | 3/2004 | Hengeveld | |
| 2004/0064512 | A1 | 4/2004 | Arora et al. | |
| 2004/0078568 | A1 | 4/2004 | Pham | |
| 2004/0107349 | A1 | 6/2004 | Sasselli | |
| 2004/0111612 | A1 | 6/2004 | Choi | |
| 2004/0133520 | A1 | 7/2004 | Callas | |
| 2004/0133775 | A1 | 7/2004 | Callas | |

(56) References Cited

U.S. PATENT DOCUMENTS

| | | | | |
|---|---|---|---|---|
| 2004/0168055 | A1 | 8/2004 | Lord | |
| 2004/0205248 | A1 | 10/2004 | Little | |
| 2004/0210772 | A1 | 10/2004 | Hooker | |
| 2005/0005106 | A1 | 1/2005 | Chen | |
| 2005/0044059 | A1 | 2/2005 | Samar | |
| 2005/0053232 | A1 | 3/2005 | Bace | |
| 2005/0076061 | A1 | 4/2005 | Cox | |
| 2005/0086527 | A1 | 4/2005 | Jackson | |
| 2005/0102528 | A1 | 5/2005 | Tan | |
| 2005/0125659 | A1 | 6/2005 | Sarfati | |
| 2005/0149732 | A1 | 7/2005 | Freeman | |
| 2005/0160292 | A1 | 7/2005 | Batthish | |
| 2005/0187966 | A1 | 8/2005 | Iino | |
| 2005/0193199 | A1 | 9/2005 | Asokan | |
| 2005/0198170 | A1 | 9/2005 | LeMay | |
| 2005/0229257 | A1 | 10/2005 | Kim | |
| 2005/0262338 | A1 | 11/2005 | Irwin | |
| 2005/0273592 | A1 | 12/2005 | Pryor | |
| 2006/0020796 | A1 | 1/2006 | Aura | |
| 2006/0031670 | A1 | 2/2006 | Price | |
| 2006/0036739 | A1 | 2/2006 | Hagale | |
| 2006/0075234 | A1 | 4/2006 | You | |
| 2006/0090073 | A1 | 4/2006 | Steinberg | |
| 2006/0094402 | A1* | 5/2006 | Kim | H04M 1/7253 455/411 |
| 2006/0133346 | A1 | 6/2006 | Cheeda | |
| 2006/0147000 | A1 | 7/2006 | Novi | |
| 2006/0149822 | A1 | 7/2006 | Henry | |
| 2006/0212928 | A1 | 9/2006 | Maino | |
| 2006/0288209 | A1 | 12/2006 | Vogler | |
| 2007/0003065 | A1 | 1/2007 | Schwartz | |
| 2007/0003066 | A1 | 1/2007 | Schwartz | |
| 2007/0005713 | A1 | 1/2007 | Levasseur | |
| 2007/0011469 | A1 | 1/2007 | Allison | |
| 2007/0016771 | A1 | 1/2007 | Allison | |
| 2007/0022469 | A1 | 1/2007 | Cooper | |
| 2007/0050624 | A1 | 3/2007 | Lord | |
| 2007/0073823 | A1 | 3/2007 | Cohen | |
| 2007/0116269 | A1 | 5/2007 | Nochta | |
| 2007/0199071 | A1 | 8/2007 | Callas | |
| 2007/0233832 | A1* | 10/2007 | Narayanan | H04L 67/104 709/223 |
| 2007/0276836 | A1 | 11/2007 | Chatterjee | |
| 2007/0277240 | A1 | 11/2007 | Durfee | |
| 2008/0019530 | A1 | 1/2008 | Eldridge | |
| 2008/0022061 | A1 | 1/2008 | Ito | |
| 2008/0091780 | A1 | 1/2008 | Balan | |
| 2008/0049941 | A1 | 2/2008 | Kim | |
| 2008/0065878 | A1 | 3/2008 | Hutson | |
| 2008/0077686 | A1 | 3/2008 | Subhraveti | |
| 2008/0095371 | A1 | 4/2008 | Vataja | |
| 2008/0098038 | A1 | 4/2008 | Motoyama | |
| 2008/0162647 | A1 | 7/2008 | Liang | |
| 2008/0165952 | A1 | 7/2008 | Smith | |
| 2008/0178004 | A1* | 7/2008 | Wei | H04L 63/0869 713/171 |
| 2008/0235336 | A1 | 9/2008 | Stern | |
| 2008/0281930 | A1 | 11/2008 | Hartselle | |
| 2009/0052660 | A1 | 2/2009 | Chen | |
| 2009/0069033 | A1 | 3/2009 | Karstens | |
| 2009/0070466 | A1 | 3/2009 | Elbring | |
| 2009/0083112 | A1 | 3/2009 | Bhogal | |
| 2009/0097662 | A1 | 4/2009 | Olechowski | |
| 2009/0100268 | A1 | 4/2009 | Garcia | |
| 2009/0132822 | A1 | 5/2009 | Chen | |
| 2009/0154705 | A1 | 6/2009 | Price | |
| 2009/0198997 | A1 | 8/2009 | Yeap | |
| 2009/0222668 | A1 | 9/2009 | Zaccone | |
| 2009/0265552 | A1 | 10/2009 | Moshir | |
| 2009/0281829 | A1 | 11/2009 | Hansen | |
| 2009/0299200 | A1 | 12/2009 | Eggenberger | |
| 2010/0002882 | A1 | 1/2010 | Rieger | |
| 2010/0017602 | A1 | 1/2010 | Bussard | |
| 2010/0031038 | A1 | 2/2010 | Kruegel | |
| 2010/0100967 | A1 | 4/2010 | Douglas | |
| 2010/0138619 | A1 | 6/2010 | Benavid | |
| 2010/0138934 | A1 | 6/2010 | Minoshima | |
| 2010/0161817 | A1* | 6/2010 | Xiao | H04L 63/126 709/229 |
| 2010/0174911 | A1 | 7/2010 | Isshiki | |
| 2010/0199340 | A1 | 8/2010 | Jonas | |
| 2010/0211541 | A1 | 8/2010 | Deetz | |
| 2010/0217984 | A1 | 8/2010 | Hill | |
| 2010/0223470 | A1 | 9/2010 | Lord | |
| 2010/0239087 | A1 | 9/2010 | Chaisson | |
| 2010/0250939 | A1 | 9/2010 | Adams | |
| 2010/0250946 | A1 | 9/2010 | Korte | |
| 2010/0262714 | A1 | 10/2010 | Hiie | |
| 2010/0275007 | A1 | 10/2010 | Kutt | |
| 2010/0296655 | A1 | 11/2010 | Solow | |
| 2010/0304766 | A1 | 12/2010 | Goyal | |
| 2011/0035591 | A1 | 2/2011 | Dudziak | |
| 2011/0131406 | A1 | 6/2011 | Jones | |
| 2011/0145564 | A1 | 6/2011 | Moshir | |
| 2011/0145571 | A1 | 6/2011 | Schmidt-Karaca | |
| 2011/0151903 | A1 | 6/2011 | Moshir | |
| 2011/0173272 | A1 | 7/2011 | Carvalho Neto | |
| 2011/0202598 | A1 | 8/2011 | Evans | |
| 2011/0246942 | A1 | 10/2011 | Misawa | |
| 2011/0307707 | A1 | 12/2011 | Fielder | |
| 2012/0030183 | A1 | 2/2012 | Deetz | |
| 2012/0030743 | A1 | 2/2012 | Semba | |
| 2012/0045064 | A1 | 2/2012 | Rembarz | |
| 2012/0096035 | A1 | 4/2012 | Spector | |
| 2012/0098639 | A1 | 4/2012 | Ijas | |
| 2012/0102326 | A1 | 4/2012 | Palekar | |
| 2012/0117568 | A1 | 5/2012 | Plotkin | |
| 2012/0159164 | A1 | 6/2012 | Brown | |
| 2012/0173353 | A1 | 7/2012 | Rausch | |
| 2012/0173880 | A1 | 7/2012 | Swaminathan | |
| 2012/0179905 | A1 | 7/2012 | Ackerly | |
| 2012/0184309 | A1 | 7/2012 | Cohen | |
| 2012/0209924 | A1 | 8/2012 | Evans | |
| 2012/0231770 | A1 | 9/2012 | Clarke | |
| 2012/0240037 | A1 | 9/2012 | Migos | |
| 2012/0030331 | A1 | 11/2012 | Deetz | |
| 2012/0297451 | A1 | 11/2012 | Ozzie | |
| 2012/0300331 | A1 | 11/2012 | Deetz | |
| 2012/0311329 | A1 | 12/2012 | Medina | |
| 2012/0331073 | A1 | 12/2012 | Williams | |
| 2013/0034229 | A1 | 2/2013 | Sauerwald | |
| 2013/0036302 | A1 | 2/2013 | Lord | |
| 2013/0046828 | A1 | 2/2013 | Grewal | |
| 2013/0070045 | A1 | 3/2013 | Meek | |
| 2013/0073850 | A1 | 3/2013 | Zaverucha | |
| 2013/0077774 | A1 | 3/2013 | Lynch, III | |
| 2013/0091298 | A1 | 4/2013 | Ozzie | |
| 2013/0097688 | A1 | 4/2013 | Charles | |
| 2013/0136255 | A1 | 5/2013 | Brown | |
| 2013/0159436 | A1 | 6/2013 | Hartselle | |
| 2013/0194301 | A1 | 8/2013 | Robbins | |
| 2013/0198522 | A1 | 8/2013 | Kohno | |
| 2013/0208725 | A1 | 8/2013 | Wakumoto et al. | |
| 2013/0219035 | A1 | 8/2013 | Detienne | |
| 2013/0227066 | A1* | 8/2013 | Sato | H04L 45/74 709/217 |
| 2013/0232209 | A1 | 9/2013 | Fernandez | |
| 2013/0252585 | A1 | 9/2013 | Moshir | |
| 2013/0254537 | A1 | 9/2013 | Bogorad | |
| 2013/0275842 | A1 | 10/2013 | Peach | |
| 2013/0290416 | A1 | 10/2013 | Nelson | |
| 2013/0304833 | A1 | 11/2013 | St. Clair | |
| 2013/0305049 | A1 | 11/2013 | Krakowski | |
| 2013/0305057 | A1 | 11/2013 | Greco | |
| 2013/0308628 | A1 | 11/2013 | Marueli | |
| 2013/0326220 | A1 | 12/2013 | Connelly | |
| 2013/0332724 | A1 | 12/2013 | Walters | |
| 2013/0339465 | A1 | 12/2013 | Zhang | |
| 2014/0033286 | A1* | 1/2014 | Zhang | H04L 63/083 726/7 |
| 2014/0052982 | A1 | 2/2014 | Ackerly | |
| 2014/0053150 | A1 | 2/2014 | Barnett | |
| 2014/0068254 | A1 | 3/2014 | Scharf | |
| 2014/0090042 | A1 | 3/2014 | Short | |

(56) References Cited

U.S. PATENT DOCUMENTS

| | | | | |
|---|---|---|---|---|
| 2014/0129785 | A1 | 5/2014 | Deetz | |
| 2014/0129838 | A1 | 5/2014 | Kim | |
| 2014/0136842 | A1 | 5/2014 | Kitze | |
| 2014/0157435 | A1 | 6/2014 | Stamos | |
| 2014/0162601 | A1* | 6/2014 | Kim | H04W 12/06 455/411 |
| 2014/0164776 | A1 | 6/2014 | Hook | |
| 2014/0169554 | A1 | 6/2014 | Scarisbrick | |
| 2014/0181221 | A1 | 6/2014 | Kushtagi | |
| 2014/0196140 | A1* | 7/2014 | Gong | H04L 67/104 726/10 |
| 2014/0206285 | A1 | 7/2014 | Jance | |
| 2014/0207887 | A1 | 7/2014 | Hartselle | |
| 2014/0207900 | A1 | 7/2014 | Liu | |
| 2014/0233736 | A1 | 8/2014 | Zhang | |
| 2014/0258719 | A1 | 9/2014 | Cidon | |
| 2014/0304508 | A1 | 10/2014 | Murphy | |
| 2014/0304515 | A1 | 10/2014 | Feuerman | |
| 2014/0307543 | A1 | 10/2014 | Marueli | |
| 2014/0325622 | A1* | 10/2014 | Luk | H04L 63/083 726/6 |
| 2014/0325667 | A1 | 10/2014 | Sun | |
| 2014/0351586 | A1 | 11/2014 | Hook | |
| 2015/0006884 | A1 | 1/2015 | Ackerly | |
| 2015/0039882 | A1 | 2/2015 | Watanabe | |
| 2015/0082391 | A1 | 3/2015 | Lerman | |
| 2015/0121549 | A1 | 4/2015 | Baessler | |
| 2015/0143546 | A1 | 5/2015 | Charles | |
| 2015/0154206 | A1 | 6/2015 | Kumar | |
| 2015/0156177 | A1 | 6/2015 | Murphy | |
| 2015/0169615 | A1 | 6/2015 | Batchu | |
| 2015/0169893 | A1 | 6/2015 | Desai | |
| 2015/0195239 | A1 | 7/2015 | Firstenberg | |
| 2015/0215291 | A1 | 7/2015 | Abdunabi | |
| 2015/0227761 | A1 | 8/2015 | Cohen | |
| 2015/0229612 | A1 | 8/2015 | Hassan | |
| 2015/0244658 | A1 | 8/2015 | Speyer | |
| 2015/0244684 | A1 | 8/2015 | Ng | |
| 2015/0264005 | A1 | 9/2015 | Brooks | |
| 2015/0264042 | A1 | 9/2015 | Lord | |
| 2015/0264540 | A1 | 9/2015 | Brooks | |
| 2015/0271653 | A1 | 9/2015 | Brooks | |
| 2015/0281185 | A1 | 10/2015 | Cooley | |
| 2015/0282117 | A1 | 10/2015 | Pozuelo et al. | |
| 2015/0304849 | A1 | 10/2015 | Moom | |
| 2015/0312260 | A1 | 10/2015 | Kim | |
| 2015/0326731 | A1 | 11/2015 | Laasik | |
| 2015/0332332 | A1 | 11/2015 | Darmaki | |
| 2015/0347770 | A1 | 12/2015 | Whalley | |
| 2015/0350036 | A1 | 12/2015 | Cooper | |
| 2015/0350119 | A1 | 12/2015 | Thirumalai | |
| 2015/0350247 | A1 | 12/2015 | Adler | |
| 2015/0350895 | A1 | 12/2015 | Brander | |
| 2015/0365395 | A1 | 12/2015 | Enriquez | |
| 2015/0370918 | A1 | 12/2015 | Patterson | |
| 2015/0373021 | A1 | 12/2015 | Tussy | |
| 2016/0013939 | A1 | 1/2016 | Jun | |
| 2016/0034692 | A1 | 2/2016 | Singler | |
| 2016/0036791 | A1 | 2/2016 | Sauerwald | |
| 2016/0055325 | A1 | 2/2016 | Ozzie | |
| 2016/0057156 | A1 | 2/2016 | Lin | |
| 2016/0063258 | A1 | 3/2016 | Ackerly | |
| 2016/0065530 | A1 | 3/2016 | Prado | |
| 2016/0072781 | A1 | 3/2016 | Zhang | |
| 2016/0191513 | A1 | 6/2016 | Tomlinson | |
| 2016/0265005 | A1 | 9/2016 | Zelle et al. | |

OTHER PUBLICATIONS

Author Unknown, 'Perfect Forward Secrecy', IBM Security SiteProtector System, http://pic.dhe.ibm.com/infocented/sprotect/v2r8m0/index.jsp?topic=%2Fcom.ibm.siteprotector.doc%2Freferences%2Fsp_agenthelp_perfect_forward_secrecy.htm, Aug. 27, 2013.

Author Unknown, 'Threema Cyrptography Whitepaper' Threema., Mar. 9, 2015.

B Kaliski, 'PKCS #7: Cryptographic Message Syntax', Version 1.5, Mar. 1998, http://tools.ietf.org/html/rfc2315.

Callas et al., 'OpenPGP Message Format', RFC 4880, Nov. 2007.

Cremers et al., 'One-round strongly secure key exchange with perfect forward secrecy and deniability', IACR Cryptology ePrint Archive, version 3, 2011.

Diffie et al., "Authentication and authenticated key exchanges", Designs, Codes and Cryptography, vol. 2, Issue 2, pp. 107-125, Jun. 1992.

Green et al., Dancing on the Lip of the Volcano—Chosen Ciphertext Attacks on Apple iMessage' Mar. 21, 2016.

Leach et al.'A Universally Unique Identifier (UUID) URN Namespace', Standards Track, Jul. 2005.

Lin et al., "An Improvement on Secure E-mail Protocols Providing Perfect Forward Secrecy", JCIS, 2006.

Moscaritolo et al., 'Silent Circle Instant Messaging Protocol Protocol Specification', Silent Circle Engineering, Dec. 5, 2012, Version 1.0.

Ms. Smith, 'How to easily encrypt email with Virtru for free: Gmail, Hotmail, Outlook, Yahoo', Network World, Jan. 28, 2014.

Pomian & Corella, LLC, 'Submission of Prior Art under 37 CFR 1.501 for U.S. Pat. No. 8,625,805'Apr. 18, 2014.

S. Kent, 'Privacy Enhancement for Internet Electronic Mail: Part 2: Certificate-Based Key Managment', Feb. 1993, http://tools.ietf.org/html/rfc1422.

Stedman et al., 'A User Study of Off-the-Record Messaging', Symposium on Unstable Privacy and Security (SOUPS), Jul. 2008.

Sui et al., 'An Improved Authenticated Key Agreement Protocol with Perfect Forward Secrecy for Wireless Mobile Communication', WCNC, pp. 2088-2093, 2005.

Sun et al., Password-based authentication and key distribution protocols with perfect forward secrecy, Journal of computer and System Sciences 72, pp. 1002-1011,2006.

Toorani et al.,'SSMS—A Secure SMS Messaging Protocol for the M-Payment Systems', Proceedings of the 13th IEEE Symposium on Computers and Communications, IEEE, Jul. 2008.

Wong et al., "Email Protocols with Perfect Forward Secrecy", Int. J. Security and Networks, vol. 7, No. 1, 2012.

Nishant Garg. Apache Kafka. Packt Publishing. Oct. 2013.

Redis Cluster Specification. Jul. 19, 2015.

Oikonomidis et al. "Identity Based Protocols for Secure Electronic Content Distribution and Licensing Proceedings of the Fourth International Conference on Web Delivering of Music", WEDELMUSIC 2004. http://ieeexplore.ieee.org/stamp/stamp.jsp?arnumber= 1358105.

Pei et al. "An Intelligent Digital Content Protection Framework between Home Network Receiver Devices", 2006 Interational Conference on Computational Intelligence and Security. http://ieeexplore.ieee.org/stamp/stamp.jsp?arnumber=4076116.

Yampolskiy, Roman V. "Mimicry Attack on Strategy-Based Behavioral Biometric", Fifth International Conference on Information Technology: New Generations, 2008. ITNG 2008. http://ieeexplore.ieee.org/stamp/stamp.jsp?arnumber=4492601.

* cited by examiner

PROVIDING REAL-TIME EVENTS TO APPLICATIONS

CROSS-REFERENCE TO RELATED APPLICATIONS

This application claims priority to U.S. Provisional Application No. 62/290,301, entitled, "Providing Real-Time Events to Applications," filed Feb. 2, 2016 and U.S. Provisional Application No. 62/318,657, entitled, "Providing Real-Time Events to Applications," filed Apr. 5, 2016, both of which are incorporated herein in their entireties by reference. This application is also related to U.S. application Ser. No. 15/224,314, entitled, "Providing Real-Time Events to Applications," filed concurrently herewith, the entirety of which is herein incorporated by reference.

BACKGROUND OF THE INVENTION

When a user downloads an app, the user may be provided with options of the types of notifications the app can receive. For instance, the user may indicate that the app can receive notifications, such as alerts, badges, sounds, or any combination thereof. In order to receive these notifications, the app must register with a third-party notification system, such as Apple Push Notification (APN) service or Google Cloud Messaging (GCM) service. In response to receiving a registration request from an app, the third-party notification system will generate a unique device token, which is provided to the app on the client device.

After receiving the unique device token, the app transmits the unique device token to the app provider (e.g., the app developer). Accordingly, the app provider will use the unique device token to provide information, such as communications, data, content, updates, or notifications, to the app. For instance, the app may be a messaging tool and the information may be a message intended for another user of an app. Alternatively, the information may be a notification generated by the app provider. The app provider obtains the receiver app's unique device token and prepares the information for delivery to the receiver's app. Once the information has been prepared, it is transmitted to the third-party notification service, along with the receiver app's unique device token. The third-party notification service receives the information and unique device token from the app provider and uses the unique device token to route the information to the correct device. Upon receiving the information, the client device uses the received unique device token to associate the information with the appropriate app and provides the information to the correct app.

BRIEF DESCRIPTION OF THE DRAWINGS

Various embodiments of the invention are disclosed in the following detailed description and the accompanying drawings.

DETAILED DESCRIPTION

Figure 1:
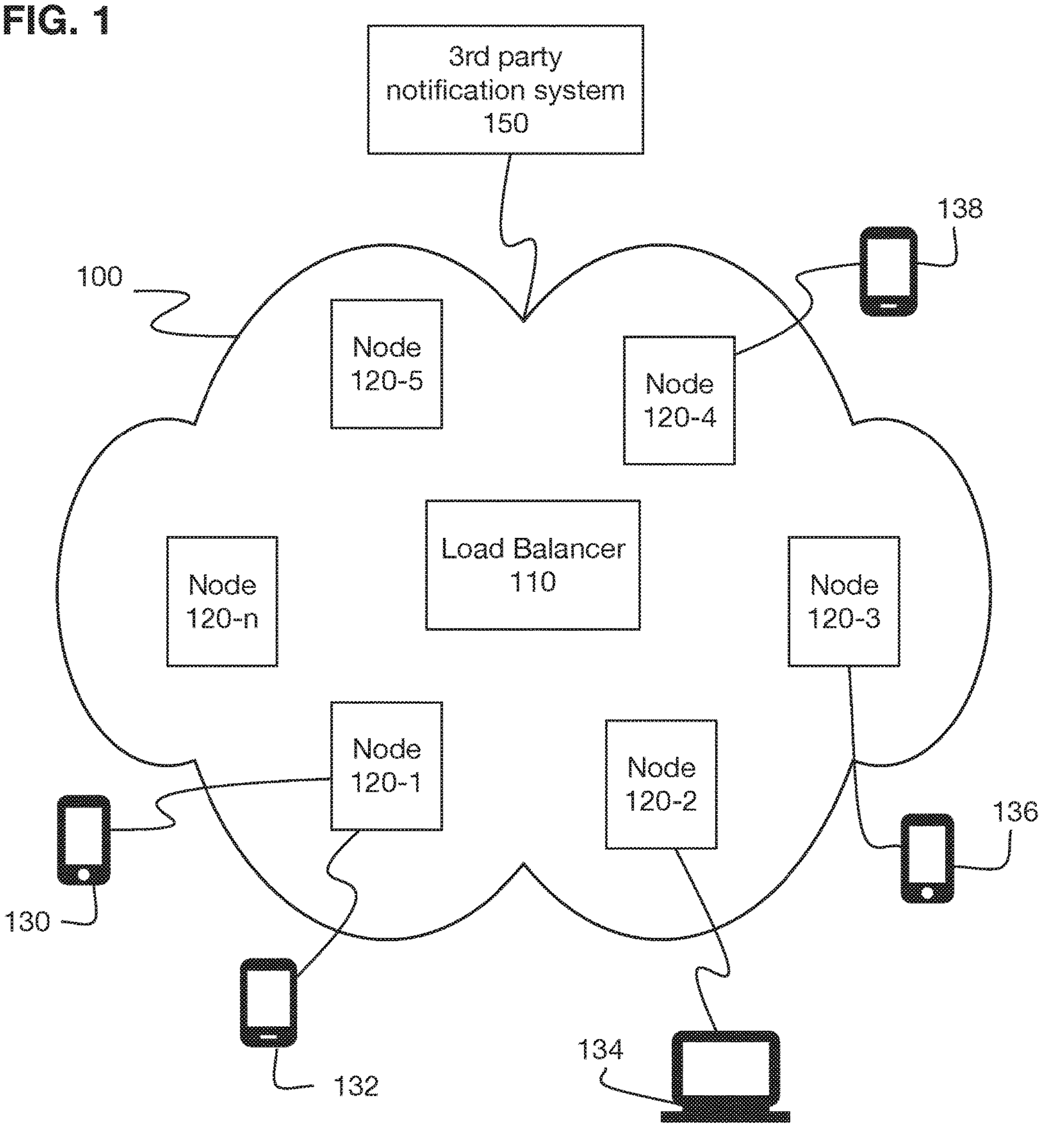
FIG. 1 illustrates an app provider system according to one embodiment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The present disclosure describes a system and method that allows an app provider to facilitate the delivery of communications—such as alerts, messages, content, gaming data, and other data—between the app provider system and client devices, as well as among client devices, without the use of a third-party push token.

The app provider's system includes a load balancer and a cluster of nodes to provide users with the functionality offered by the app. For example, the cluster of nodes may allow users of the app to interact with each other. Alternatively, the cluster of nodes may provide a gaming interface to users of the app. In this regard, the cluster of node may include physical servers, virtual machines, or any combination thereof to render the services offered by the app provider.

Each node in the cluster of nodes includes at least a reactor module, a processor module, a plurality of queues, and an incoming message queue. In operation, client devices connect to the node and register with the app provider's system via the reactor module. The processor module includes a distributed routing table that contains entries for each connected client device and to which node they are connected. Each of the plurality of queues is assigned to a client device connected to a node in the cluster and stores communications for delivery to the client node. The incoming message queue is a distributed storage for all information received by the app provider. Entries in the receiver's queue include a pointer to the communication stored in the incoming message queue.

Additionally, each node includes replication data for at least one other node in the app provider system. The replication data includes the reactor module, the processor module, a plurality of queues, and the incoming message queue. The plurality of replicated queues may maintain the same state information as the plurality of queues on the node hosting the receiver's queue.

As noted above, a client device will connect to a node in the cluster of nodes. Specifically, the load balancer will distribute client devices amongst the nodes in the cluster. Once connected to the node, the client device will provide authentication information to the node. The node will verify the authentication information provided by the client device. If the verification fails, the node will deny the connection request.

However, when the verification is successful, the reactor module will register the client device with the cluster of nodes. Registration includes creating an ephemeral identifier for the client device, to which the device is bound. Next, the reactor module creates an entry in the distributed routing table for the client device that includes a client identifier, the ephemeral identifier, and information about which node the client device is connected to. Finally, the entry is propagated to the other nodes to update the distributed routing table maintained on those nodes.

Once registration is complete, a secure, persistent connection between the client device and the node is created. This persistent connection allows the client device to send and receive communications, such as messages, notifications, and other data, more efficiently and securely than through the use of a third-party notification system.

For example, when a first user, Alice, wants to communicate with a second user, Bob, she will connect to the app provider system and compose her message. After sending her communication, Alice's app will transmit it to the node her device is connected to. The reactor module receives the communication and provides the communication to the incoming message queue. While storing the communication in the incoming message queue, the reactor module will process the communication to determine how to handle the communication. For example, if the communication is a secure message, the reactor module may determine one or more receivers of the secure message. This may include determining an ephemeral identifier for each of the receivers of the secure message. If the reactor module recognizes the ephemeral identifier, it determines that the receiver's device is connected to the same node as Alice. Accordingly, the reactor module will route the communication directly to the receiver, Bob, without any further processing required by the node.

However, if the reactor module does not recognize the receiver's ephemeral identifier, it passes Alice's communication to the node's processor module. The processor module accesses the distributing routing table to determine if Bob's device is connected to the app provider system, and if so which node in the app provider system. If Bob's device is connected to a different node in the app provider system, the first node packages Alice's communication and transmits it to the reactor module of the node that Bob's device is connected to. The reactor module on the second node adds a notification to Bob's queue. Further, the second reactor module provides notification to Bob's device that a communication has been received. Accordingly, Bob's device will receive the notification in due course from his queue.

If the processor module determines that the receiver's devices are not connected, the app provider system may employ one of several fallback mechanisms to deliver Alice's communication. For instance, as communications are continually received for Bob, notifications would accumulate in Bob's assigned queue, with each entry in the queue having a pointer to the location of the communication in the incoming message queue. The pointer may track the accumulated notifications received by the app provider system since the last time Bob's device connected. The next time Bob's device connects to the app provider system, the newly received notifications are delivered in the order that they were received. For instance, Bob's queue may be flushed from the location of the pointer onward. Additionally, the pointer may be used to retrieve communications in Bob's queues that were indicated as previously delivered. In this regard, the app provider system may store communications in accordance with end-user service level agreements. Alternatively, the failback mechanism may include sending the communication, such as a message and notification, to a third-party notification service. The third-party notification service may then provide the notification to Bob's device using standard techniques. Accordingly, Bob may log into the app provider to retrieve his communications after receiving notification from the third-party notification server.

Periodically, one of the nodes in the app provider system may fail. In these situations, the client devices connected to that node will attempt to reconnect to the app provider system. Accordingly, the load balancer will redistribute the client devices across available nodes using load balancing techniques. In the event of a node failure, information that has not yet been delivered to client devices will not be lost. In this regard, user queues are not necessarily located on the node that the client device is connected to. Further, each queue is replicated on at least one other node. Accordingly, notifications from the replicated queue will be provided to the client device when the app provider system detects a connection event.

Further, in times of high volume, the app provider system may add additional nodes to deal with the additional volume. In this regard, the app provider system may provision a new node for the cluster. The new node may send a broadcast to the other nodes in the app provider system. Based on the other nodes' responses, the app provider system may realign to accommodate the new node. After realignment, the new node may be configured as a participant in the app provider system. This includes installing the reactor module, the processor module, a plurality of queues, and the incoming message queue. Further, the new node will be provided with replication information for at least one other node in the app provider system. Once the new node is configured, it will be allowed to receive connection requests from client devices and perform the processing described above.

Accordingly, the above-described system and processes allow app providers to provide information to client devices more securely and efficiently without the use of a push token provided by a third-party notification service. While the examples describe providing notifications and messages without the use of a third-party push token, the systems and processes may be applicable to other techniques, such as receiving notifications, messaging, file transfers, news, and other communications from the app provider and other third parties. For example, the app provider may want to provide a communication regarding an update to the app to all client devices. The app provider transmits the notification to every client device using the techniques described above. In particular, the reactor modules on each node determine whether the client device is connected thereto. If it is, the notification is added to the client device's queue and delivered in due course. If not, the notification passes to the processor module, which determines the node that the client device is connected to. The notification is forwarded to that node's reactor module, where it is subsequently added to the client device's queue to be delivered in the order in which it was received.

FIG. 1 illustrates an app provider system 100 according to one embodiment of the disclosure. The app provider system 100 includes a load balancer 110 and six nodes: 120-1, 120-2, 120-3, 120-4, 120-5, and **120-*n*. In various embodiments, the load balancer 110 is a high availability proxy that provides fast and reliable load balancing for secure, persistent connections. Additionally, the six nodes illustrated in FIG. 1 may include physical servers, virtual machines, or any combination thereof. In various embodiments, the nodes may be a plurality of virtual machines provided by a cloud service provider. In this regard, the virtual machines may be located on physical servers in a data center, server farm, or cloud-computing environment. According to various embodiments, the app provider system 100** may be distributed amongst a plurality of data centers around the world that communicate with each other. In this regard, the app provider system may include a load balancer for each data center, server farm, and/or cloud-computing environment. Furthermore, each data center, server farm, and/or cloud-computing environment may include any number of nodes to handle the workload for that data center. Accordingly, the app provider system may provision or remove nodes as discussed in greater detail below.

FIG. 1 also shows client devices 130, 132, 134, 136, and 138 connected to various nodes in app provider system 100. Client devices 130, 132, 134, 136, and 138 may be any device capable of downloading and executing an app provided by the app provider system 100, including, for example, mobile devices—such as laptops, smart phones, tablets, and phablets; computing devices—such as desktop computers and virtual machines; and internet-enabled devices—such as appliances, manufacturing equipment, and industrial equipment. Accordingly, client devices 130, 132, 134, 136, and 138 may be configured to access the app provider system 100 via the downloaded app. Additionally, FIG. 1 shows the app provider system 100 connected to a third-party notification system 150. The third-party notification system 150 may include Apple Push Notification (APN) service and/or Google Cloud Messaging (GCM) service. In operation, client devices 130, 132, 134, 136, and 138 may connect to the app provider system 100 using the downloaded app via a network, such as the Internet. For example, if the app is a secure messaging app, client devices may connect to the app provider system 100 to send and receive messages using an app installed on the client devices. In another example, the app may be a game and the client devices access the app provider system to interact with the gaming environment.

Figure 2:
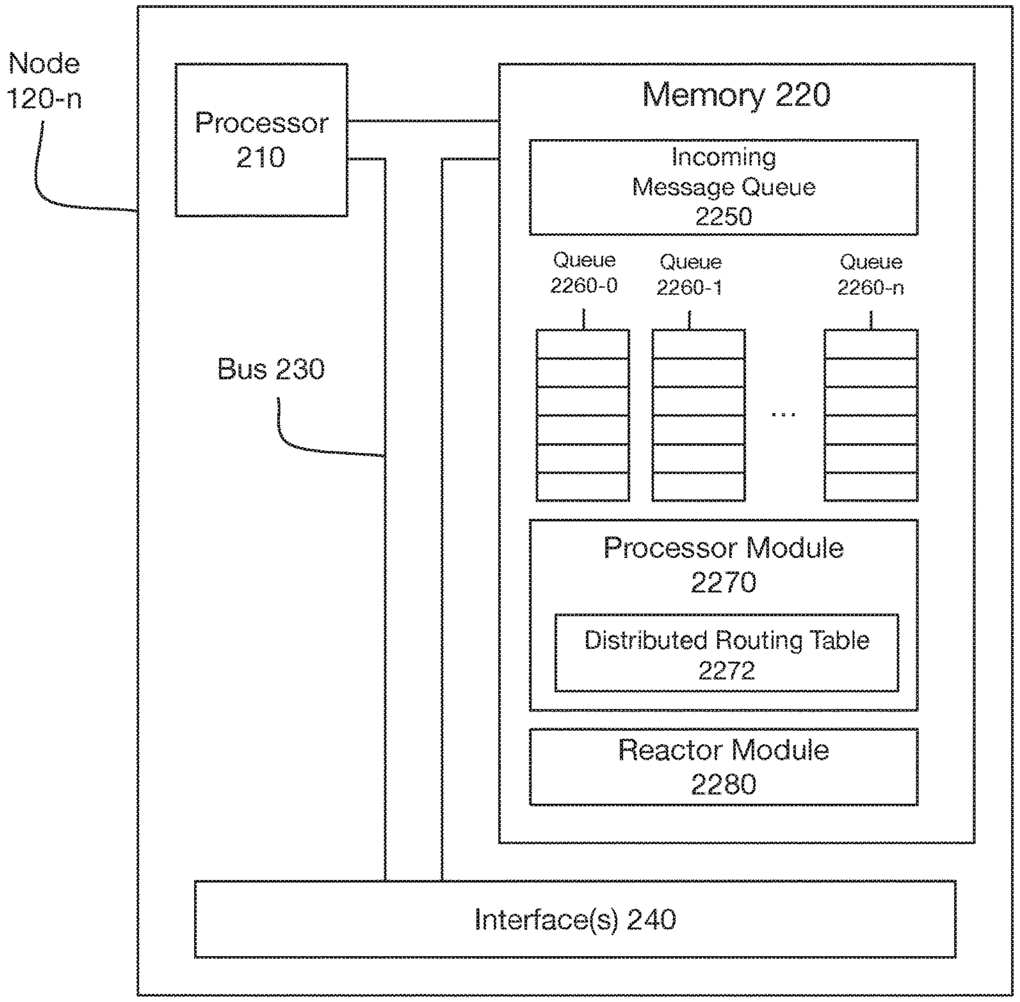
FIG. 2 shows an example of a node in app provider system according to an embodiment of the disclosure.

In order to provide the functionality provided by the app, each node in the app provider system needs to be configured to provide the services offered by the app. FIG. 2 illustrates a node **120-*n* in app provider system 100. Node 120-*n* includes a processor 210, a memory 220, and an interface 240 all interconnected by bus 230**.

Processor 210 may be any processor capable of interacting with the components of node **120-*n*. For example, processor 210 may include a processor, multiprocessors, a multicore processor, a dedicated controller, such as an ASIC or an FPGA, or any combination thereof. Memory 220 may store information accessible by processor 210, including instructions and data that may be executed or otherwise used by the processor 210 for providing functionality to the app. For example, memory 220 may include a plurality of modules that, when executed by processor 210, perform functionality that enables the app to interact with the app provider system and other users of the app. In particular, memory 220 includes an incoming message queue 2250; a plurality of user queues 2260-0, 2260-1, 2260-*n*; a processor module 2270; and a reactor module 2280. The incoming message queue 2250 may be configured to store communications until they are delivered. For example, if the app is a secure messaging app, incoming message queue 2250 may store communications, such as messages, pictures, video, animated gifs, content, etc., until they are delivered to a recipient. Alternatively, if the app is a game, the incoming message queue 2250 may store an opponent's move or countermove until it is delivered to the intended user. Each of the plurality of user queues 2260-0, 2260-1, and 2260-*n* may be assigned to app users and configured to enqueue notifications and other communications for delivery to the assigned user. In various embodiments, the plurality of user queues 2260-0, 2260-1, and 2260-*n* may be distributed commit logs; however, the plurality of user queues may be any suitable queue including, for example, first-in first out (FIFO) queues, circular queues, priority queue, etc. Furthermore, the plurality of user queues may not be located on the same node that the user's app is connected to. Instead, the nodes may communicate with each other to add events to each user's assigned queue. The processor module 2270 may be configured to route information to users connected to different nodes. In this regard, processor module 2270 may include a distributed routing table 2272. Distributed routing table 2272 maintains routing information that reflects which nodes that users are connected to. The reactor module 2280 may be configured to accept users' connection requests, generate ephemeral identifiers for each of the users connected to the node, and route information between users connected to the same node. In order to accommodate the queues and modules, memory 220 may be any type of media capable of storing the information above, including a non-transitory computer-readable medium or any other suitable medium that stores data that may be read with the aid of an electronic device, such as a hard-drive, solid state drive, memory card, flash drive, ROM, RAM, DVD, or other optical disks, as well as other write-capable and read-only memories. Memory 220 may include short term or temporary storage as well as long term or persistent storage. According to some embodiments, memory 220 may be a storage area network (SAN) that is accessible by processor 210**.

Interface(s) 240 may be dedicated hardware, software, or a combination thereof that is capable of connecting node 120-*n* to a network. In particular, interface(s) 240 may be capable of connecting and communicating with client devices that have an instantiation of the app installed thereon. Further, interface(s) 240 may be configured to communicate and interact with other nodes in the app provider system 100. In this regard, interface(s) 240 may include various configurations and use various communication protocols including Ethernet, TCP/IP, ATM, Simple Object Access Protocol (SOAP), Representational State Transfer (REST), cellular and wireless communication protocols (e.g. 802.11, LTE), instant messaging, HTTP and SMTP, and various combinations of the foregoing.

Figure 3:
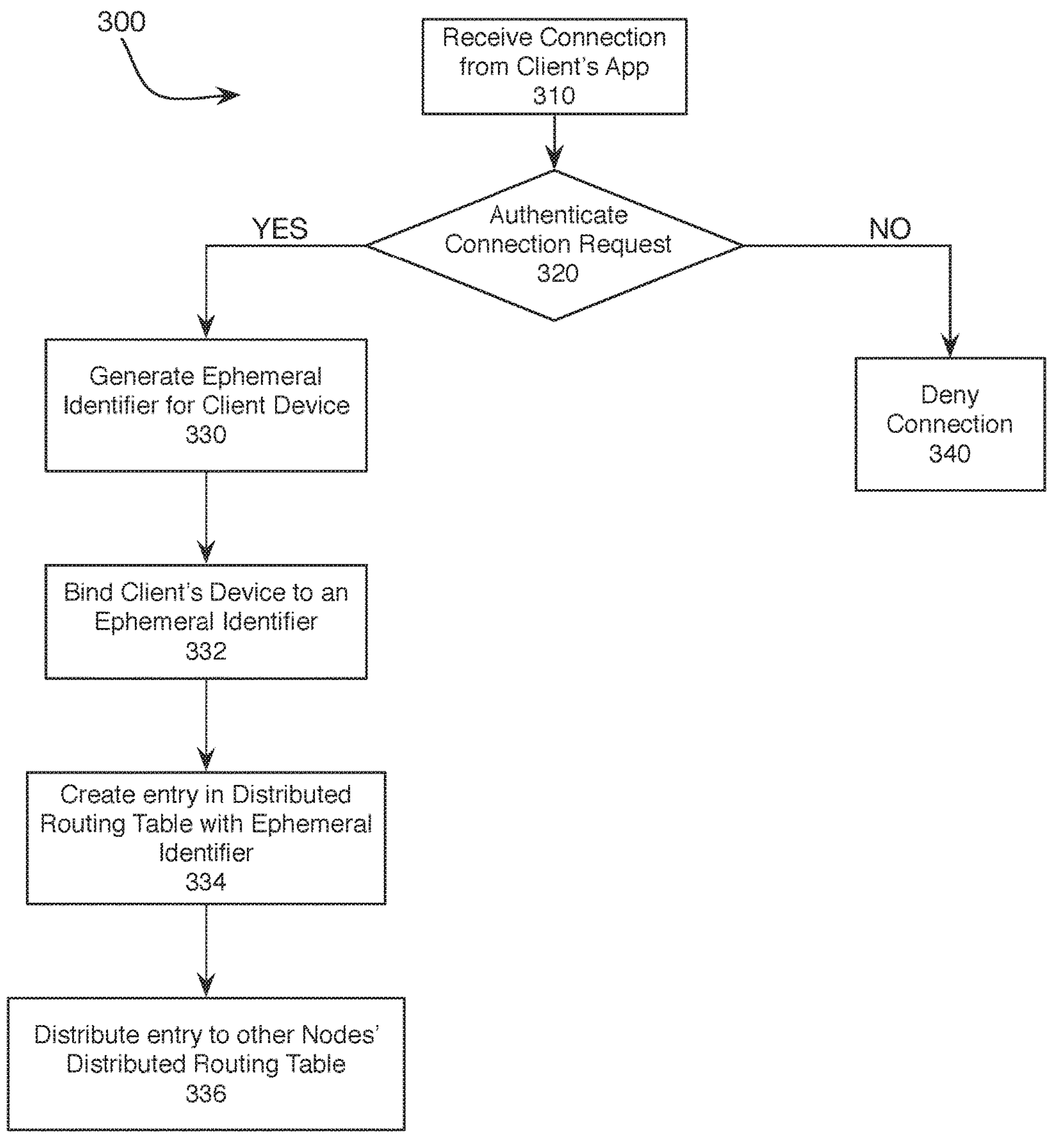
FIG. 3 illustrates an exemplary process for an app connecting to the app provider system.

In order to access the full functionality of the app, user devices will need to connect to the app provider system. FIG. 3 illustrates a process 300 for connecting to the app provider system.

Process 300 begins in block 310 when a connection request is received from one of the client's apps. According to various embodiments, the load balancer will receive a connection request from the client app that includes an application identifier. The load balancer then determines whether the client app has previously connected to a node in the app provider system. In some embodiments, the load balancer hashes the received application identifier to generate an ephemeral identifier. The load balancer uses the generated ephemeral identifier to determine if the client app has previously connected to the system, and, if so, routes the client app to the node with which it previously connected. If the load balancer determines that the client app has not previously connected to the app provider system, the process proceeds to route the client app to an available node in the app provider system. In block 320, the connection request may be authenticated. In some embodiments, the reactor module located on the node will perform the authentication. In some embodiments, the authentication information may be a blob of data based on the user's password that is received from the client device and used to decrypt information stored on the app provider system. If the app provider system successfully decrypts the information using the received blob of data, then the user's identity is validated. Alternatively, the authentication information may include a username and password, which the reactor module compares to a database of authentication information. In still yet other examples, the authentication information may include multifactor authentication. For instance, the user may have to enter a password and a one-time code or biometric information and a one-time password. Accordingly, the reactor module may compare the multifactor authentication information to information stored by the app provider system to determine whether to authenticate the user and allow the app to connect to the app provider system.

If the authentication request fails, the process proceeds to block 340 where the app's connection request is denied. However, if the authentication is successful, the process proceeds to block 330 in which a secure, persistent connection is established between the client device and the app provider system and an ephemeral identifier is generated for the client device. According to various embodiments, the ephemeral identifier is generated by the reactor module. In particular, the reactor module may generate the ephemeral identifier by concatenating a node identifier and a hash of information related to the client device. The information related to the client device may include a username, device information—such as hardware identifiers, or any combination thereof. In block 332, the ephemeral identifier is bound to the client's device. In block 334, an entry is created in the distributed routing table that includes a client identifier, the ephemeral identifier, and information about which node the client device is connected to. As noted above, the entries in the routing table may be used to route information to clients' apps, and specifically, the nodes that those clients are connected to. Finally, in block 336, the newly created entry is distributed to other nodes in the app provider system. In this regard, the other nodes may update their distributed routing tables to reflect the new connection and enable information to be routed to the new device.

Figure 4:
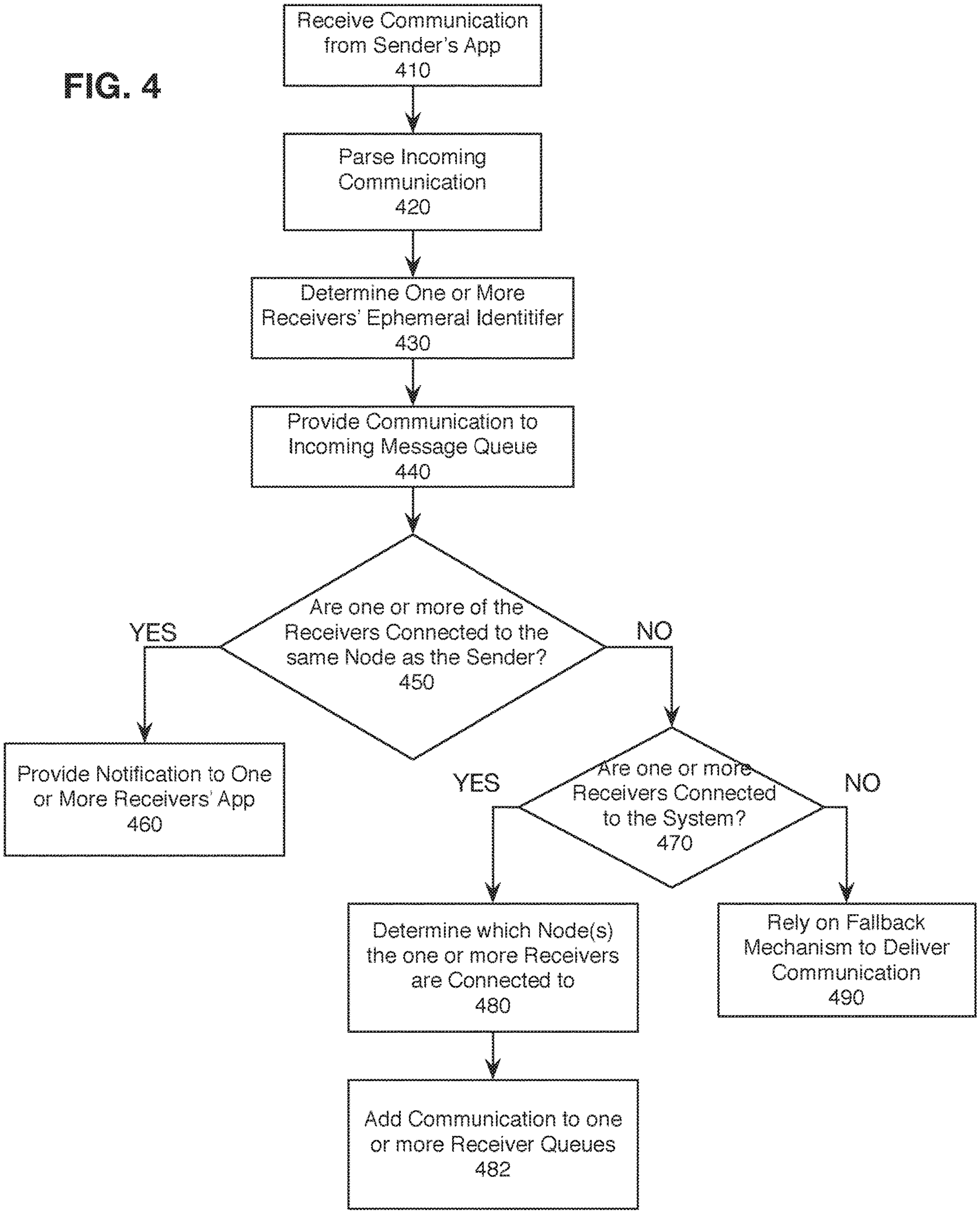
FIG. 4 illustrates a flowchart according to one embodiment for handling communications received from a user app addressed to another user's app.

After a user app has connected to the app provider system, the user app may begin to interact with the app provider system. According to some examples, this may include communicating with other users of the app. FIG. 4 illustrates a flowchart of how the app provider system handles communications received from a sender's app that are addressed to one or more receivers. As used herein, "communication (s)" may include: notifications (e.g., push notifications), text messages, chat room messages, file sharing, file collaboration, control messages, commands, e-mails, documents, audiovisual files, Short Message Service messages (SMSes), or telecommunication data, such as voice calls (i.e., VOIP), teleconferences, video calls, and video conferences. Additionally, communications may include electronic transactions, such as credit card security, password protection, directories, and storage drive protection, video on demand security, online gaming, gambling, electronic distribution of music, videos, documents, online learning systems, databases, cloud storage and cloud environments, bank transactions, voting processes, military communications, security of medical records, communication between medically implanted devices and doctors, etc.

The process begins in block 410 with the app provider system receiving a communication from a sender's app. In various embodiments, a node in the app provider system receives the communication from the sender's app. In particular, the reactor module receives the incoming communication via a secure, persistent channel, such as Secure Sockets Layer (SSL) or Transport Layer Security (TLS). In various embodiments, incoming communications may also be encrypted via the Advanced Encryption Standard (AES) using at least one 256-bit encryption key that is shared between the app and the provider system. Upon receiving the communication, the reactor module parses the incoming communication in block 420. According to various embodiments, the communication is an encrypted message intended for one or more receivers. In this regard, the communication includes a header and a payload. The header includes sender information, receiver information, and decryption information. In various embodiments, the decryption information includes information necessary to decrypt the sender's message that only the intended receiver can decrypt and access. The payload of the communication includes the encrypted message and metadata identifying the one or more receivers of the sender's encrypted message.

In block 430, the node determines the one or more receivers' ephemeral identifiers. In various embodiments, the reactor module uses the metadata included in the payload of the communication to determine the one or more receivers of the communication. In this regard, the reactor module calculates the ephemeral identifier for each of the one or more receivers by performing a hash function on the receiver information contained in the metadata. Alternatively, the reactor module may refer to the distributed routing table to look up the one or more receivers' ephemeral identifier. For example, the reactor module may use the one or more receivers' information contained in the metadata, or a hash thereof, to obtain the one or more receivers' ephemeral identifier from the distributed routing table. In block 440, the communication is transmitted to the incoming message queue. That is, the reactor module stores the communication to the incoming message queue. According to some embodiments, writing the communication to the incoming message queue includes storing the communication on a node in a data center that is in geographic proximity to the receiver. In various embodiments, the communication is stored in the incoming message queue of the node that the receiver is connected to.

In block 450, the node determines whether one or more receivers' devices are connected to the same node as the sender device. In particular, the reactor module may perform the determination. In block 460, the node provides notification to the one or more receivers' apps when one or more of the receivers' devices are connected to the same node as the sender's device. In this regard, the reactor module may publish the notification to each of the one or more receivers' user queues. Alternatively, the reactor module may bypass the one or more receivers' user queues and provide the one or more receivers' apps with a push notification that they have a new communication. In yet another alternative, the reactor module may push the communication directly to the one or more receivers.

If, however, the reactor module determines that the one or more receiver devices are not connected to the same node as the sender device, the reactor module passes the communication to the processor module, which will determine whether the one or more receiver devices are connected to the app provider system in block 470. In various embodiments, the processor module uses the distributed routing table to determine whether one or more receiver devices are connected to the app provider system. When one or more receivers are connected to the app provider system, the processor module determines which node(s) the one or more receivers are connected to in block 480. For example, the processor module uses information contained in the distributed routing table to determine which node(s) the one or more receivers are connected to. In block 482, the newly received communication is added to the one or more receivers' user queues. In due course, the one or more receivers' apps will receive a notification of the new communication from their respective user queue. For instance, the notifications may be provided to the receivers' apps as soon as they arrive in the user queue, thereby providing near real-time notification of received communications. Alternatively, notifications may be provided from user queues using a throttling technique. That is, if the one or more receivers are active on the app provider system, alerts may be pushed every minute. However, if the one or more receivers are inactive, the time between alerts being pushed may gradually be increased. This technique can be repeated when the one or more users becomes active again.

When the node determines that one or more receivers are not connected to the app provider system, the app provider system relies on a fallback mechanism to deliver the communication to one or more receiver devices in block 490. In various embodiments, the fall back mechanism includes publishing received communications in the user queues. The next time the user's app connects to the app provider system, the app provider system detects a connection event and delivers the communications, or at least notifications of the communications, to the user's app. That is, the user's queue would be flushed of all communications received since the last time the user device connected to the app provider system. Alternatively, the fallback mechanism may provide the communication to a third-party notification system for notification and delivery using a push token via the techniques described above.

Figure 5:
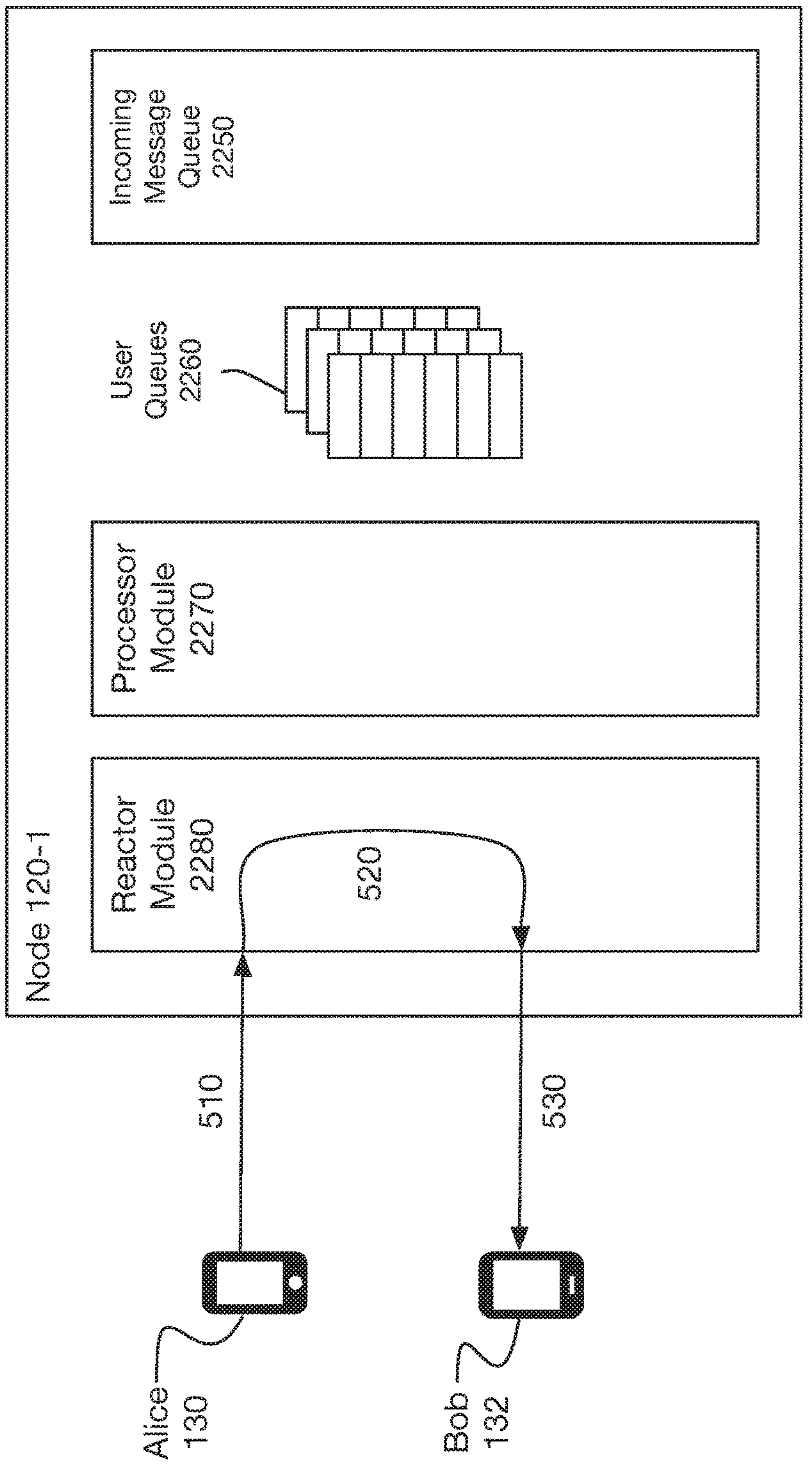
FIG. 5 shows an exemplary flow communications between two communicants connected to the same node.

Turning to FIG. 5, an exemplary flow of a communication between two communicants connected to the same node is illustrated. In particular, FIG. 5 shows a first user device 130 ("Alice") and a second user device 132 ("Bob") connected to node 120-1. As discussed in greater detail above, node 120-1 includes incoming message queue 2250, a plurality of user queues 2260, a processor module 2270, and a reactor module 2280. According to the example illustrated in FIG. 5, Alice and Bob have both connected to a node in the app provider system; specifically, the load balancer delegated Alice and Bob to node 120-1. Further, node 120-1 has authenticated both Alice and Bob and assigned them each a unique ephemeral identifier. Thus, node 120-1 maintains a first secure, persistent connection with the first user device 130 and a second secure, persistent connection with the second user device 132.

In 510, Alice's user device 130 transmits a communication to the node 120-1 via the first secure, persistent connection. As noted above, the communication may be an encrypted message. In 520, the node 120-1 receives the communication from Alice's user device 130. Specifically, the reactor module 2280 receives the communication from Alice's user device 130 and begins processing the communication. This may include, for example, determining one or more receivers of the communication and transmitting the communication to the incoming message queue (not shown). According to various embodiments, the reactor module may generate an ephemeral identifier for each of the one or more receivers in order to determine the one or more receivers. In alternative embodiments, the reactor module may access the distributed routing table to determine the one or more receivers' ephemeral identifiers and which node the receiver device is connected.

After determining the one or more receivers' ephemeral identifiers, the reactor module 2280 determines whether any of the one or more receivers are connected to node 120-1. In this regard, the reactor module 2280 may maintain a table or database of user devices connected to node 120-1. Accordingly, the reactor module 2280 may refer to its own table or database to determine whether one or more receivers are connected to the node 120-1. Alternatively, the reactor module 2280 may access the distributed routing table maintained by the processor module 2270 to determine whether one or more receivers are connected to the same node as the sender device. If one or more receiver devices are not connected to the same node as the sender, the reactor module passes the communication to the processor module for further processing as discussed in greater detail below. However, if the one or more receiver devices are connected to the same node as the sender device, the reactor module routes the communication directly to the one or more receiver devices without any further processing required by the app developer system. In 530, the reactor module transmits Alice's communication directly to Bob's user device 132. By allowing the app provider system to handle the received communication and forward it to the intended recipient, the app provider system provides quicker and more efficient notification of the communication in a more secure manner than using a third-party notification system since third-party notification systems may be imitated by a malicious user, thereby exposing users of the app to receiving malicious communications.

Figure 6:
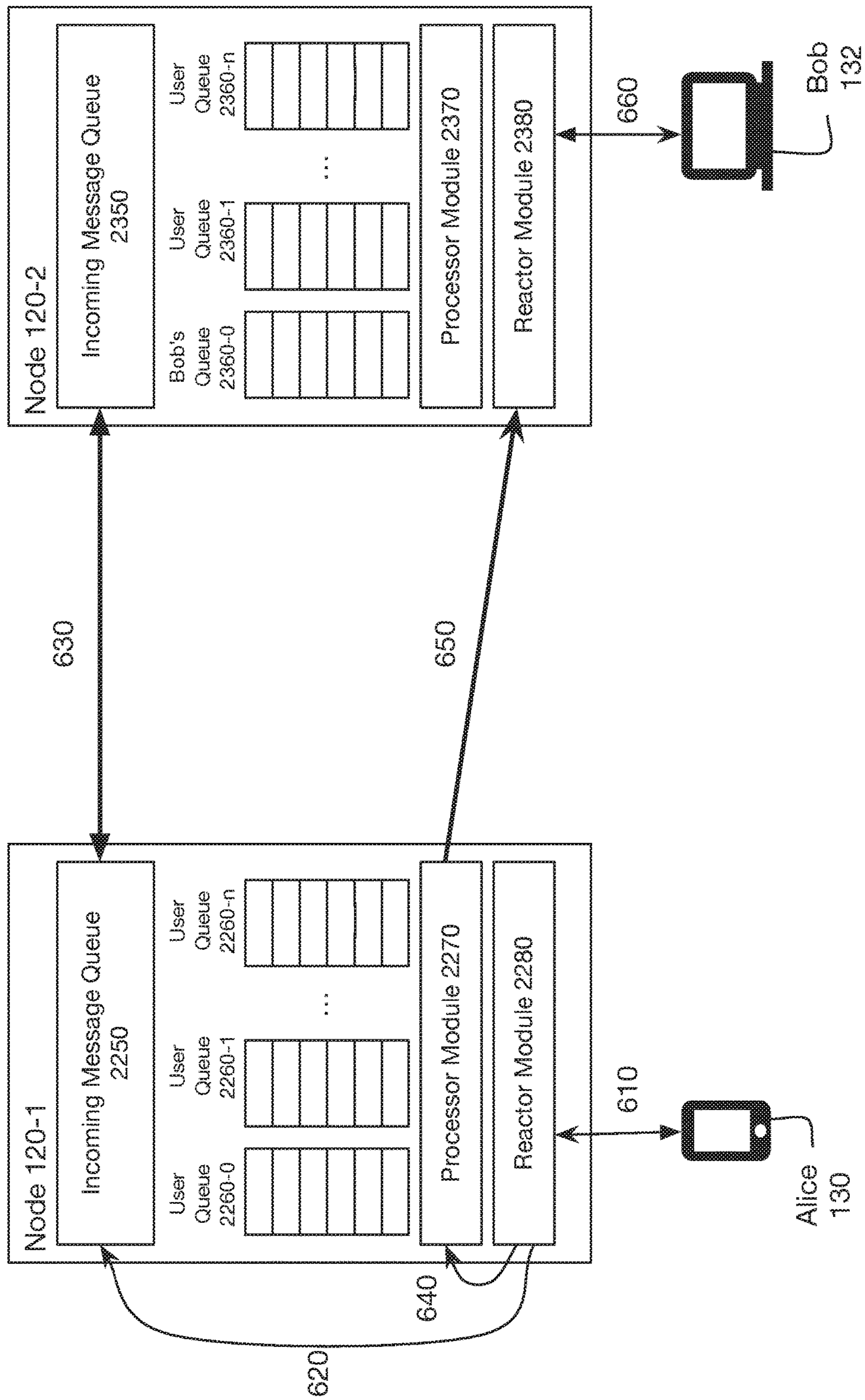
FIG. 6 illustrates an example of exchanging communications between user devices connected to different nodes in the app provider system.

More often than not, user devices will be connected to different nodes in the app provider system. FIG. 6 illustrates an example of exchanging communications between user devices connected to different nodes in the app provider system.

FIG. 6 shows Alice's first user device 130 connected to a first node 120-1 and Bob's second user device 132 connected to a second node 120-2. The first node 120-1 includes a first incoming message queue 2250; a plurality of first user queues 2260-0, 2260-1, . . . **2260-*n*; a first processor module 2270; and a first reactor module 2280. Similarly, the second node 120-2 includes a second incoming message queue 2350; Bob's user queue 2260-0; a plurality of second user queues (e.g., 2360-1, . . . 2360-*n*); a second processor module 2370, and a second reactor module 2380. The first node 120-1 and the second node 120-2 may be two nodes located in a cluster in the same data center. Alternatively, the first node 120-1 and the second node 120-2 may be located in different clusters in different data centers that belong to a single app developer system. In this regard, the two data centers may be interconnected via the Internet. Alternatively, the two data centers may be interconnected through a secure channel, such as a Virtual Private Network (VPN), leased lines, SSL, dark fiber, multiprotocol label switching (MPLS), multichassis link aggregation (MLAG), or any other secure communications channel. Further, the first incoming message queue 2250 and the second message queue 2350 may be a distributed table or database that is shared amongst the plurality of nodes in the app provider system. Alternatively, the first incoming message queue 2250 and the second message queue 2350 may be a storage area network (SAN) that is accessible by all the nodes in the app provider system. According to other examples, the first incoming message queue 2250 and the second message queue 2350** may be a single incoming message queue distributed amongst a plurality of nodes.

Returning to FIG. 6, Alice wishes to send a communication to Bob. In this regard, Alice's user device 130 transmits the communication to the first node 120-1 via a secure, persistent connection, such as SSL or TLS, in 610. The first reactor module 2280 receives the communication from Alice's user device 130 and begins processing it. For instance, the first reactor module 2280 transmits the communication to the first incoming message queue 2250 in 620. In 630, the first incoming message queue 2250 may distribute the communication to other incoming message queues. Distributing the communication may include providing copies of the communication to other incoming message queues on other nodes. Alternatively, distributing the communication may include updating table or database entries on other nodes' incoming message queues. In embodiments where the incoming message queue is a single queue accessible by all nodes in the app provider system, distributing the communication may be skipped.

While the communication is being stored in the incoming message queue, the reactor module 2280 processes the communication. As noted above, the reactor module 2280 determines whether one or more receiver devices are connected to the first node 120-1. Returning to the example illustrated in FIG. 6, the reactor module 2280 determines that Bob, one of the receivers of Alice's communication, is not connected to node 120-1. Accordingly, the first reactor module 2280 will pass the communication to the first processor module 2270 for further processing.

The first processor module 2270 obtains receiver information from the communication. After obtaining the receiver information, the first processor module 2270 may access the distributed routing table to determine if Bob's device 132 is connected to the app provider system. If the first processor module 2270 determines that Bob's device 132 is connected to the app provider system, the first processor module 2270 determines which node Bob's device 132 is connected to. In 650, the first processor module 2270 forwards Alice's communication to the second reactor module 2380 located on the second node 120-2.

Upon receiving the communication, the second reactor module 2380 may deliver the communication to the Bob's device 132 in 660. Delivery of the communication may include publishing the communication to Bob's queue 2360-0. In this regard, Bob's device may receive notification of Alice's communication in due course. According to this example, the notification received by Bob's device 132 would include information such that the app could retrieve the communication from the incoming message queue. Alternatively, reactor module 2380 may push a notification and the communication directly to Bob's device.

Figure 7A:
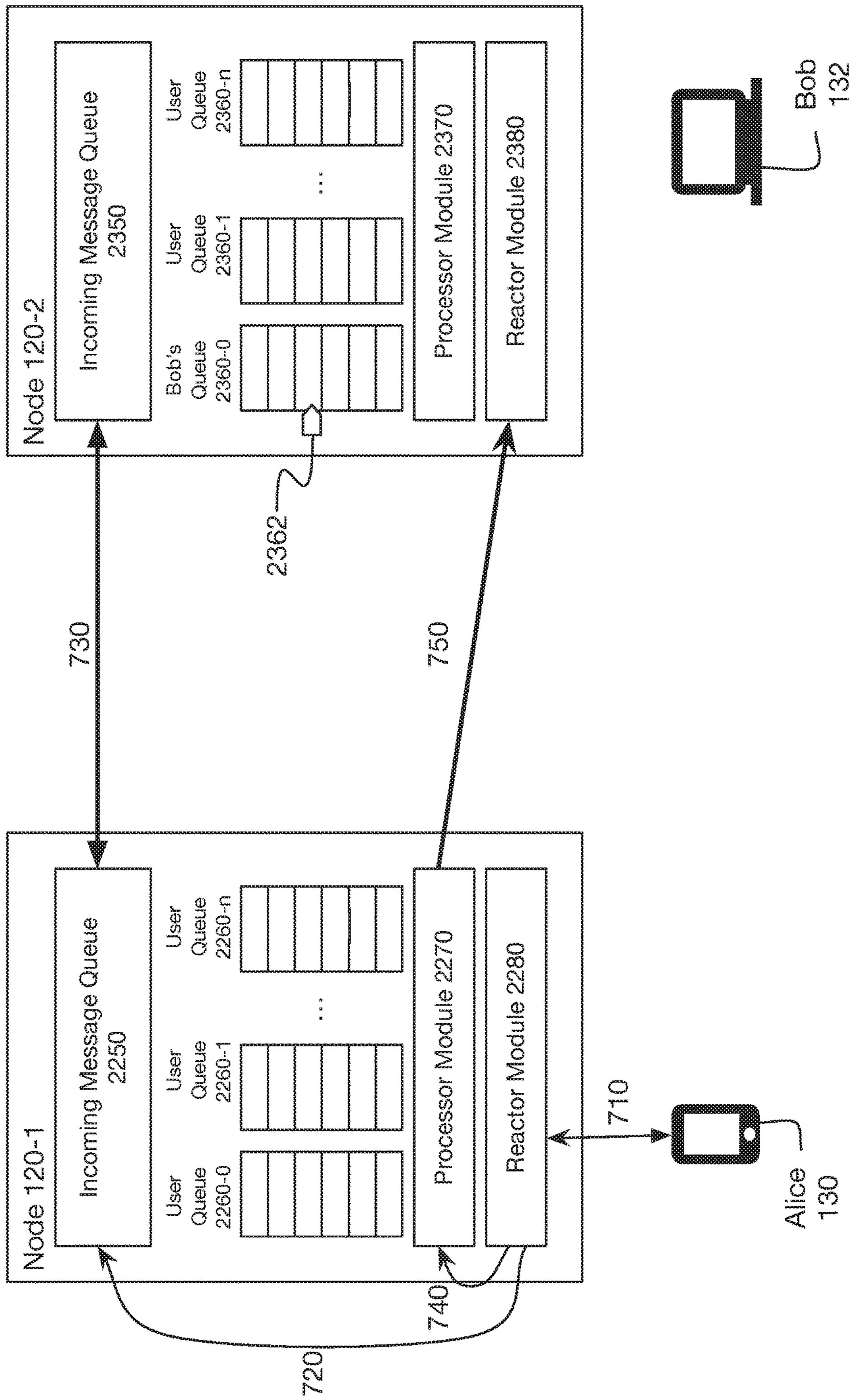
FIGS. 7A and 7B illustrate embodiments of the app provider system handling communications when a user device is not connected to the app provider system.
Figure 7B:
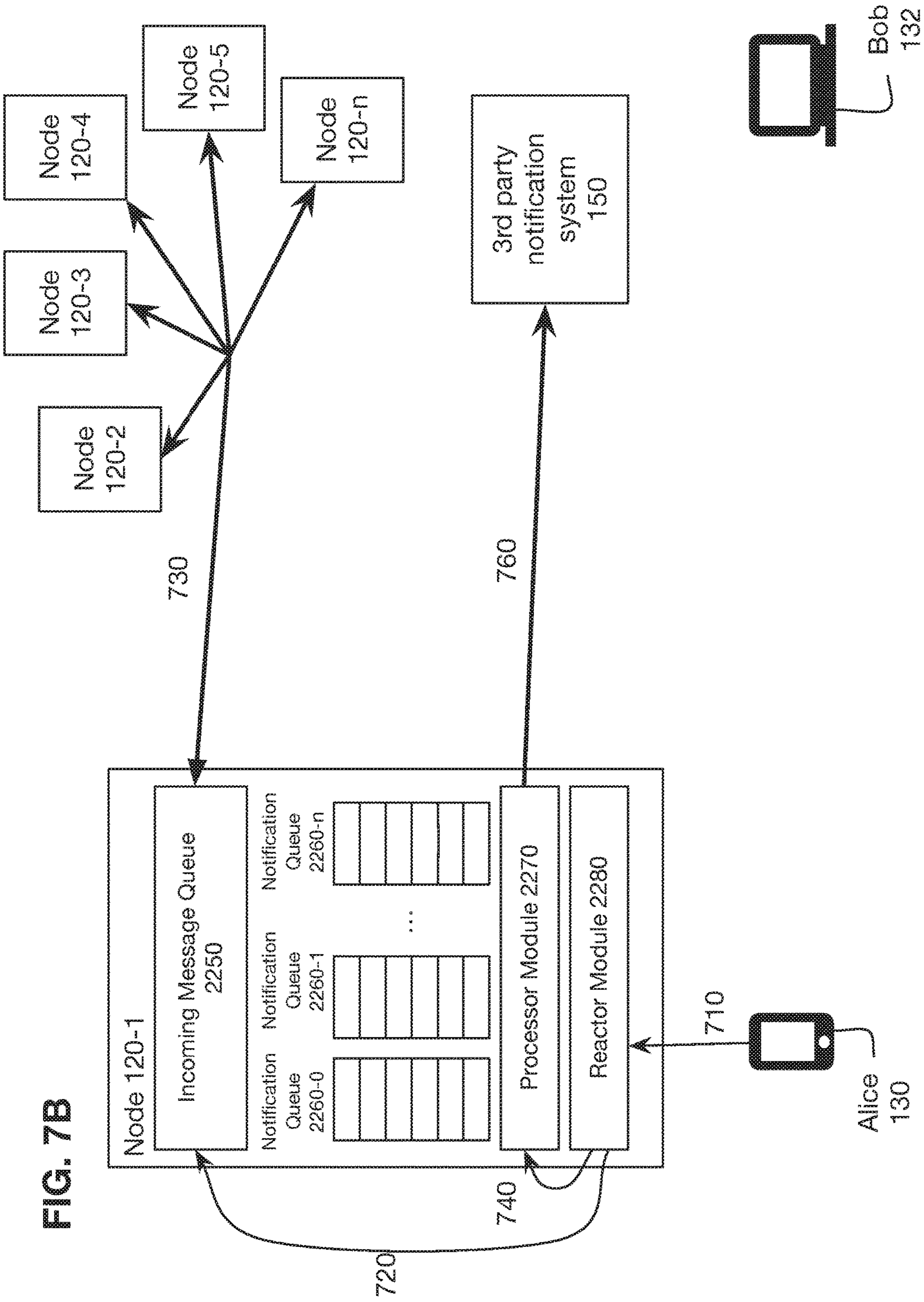

From time to time, a user device may disconnect from the app provider system. For instance, the user device may be powered down or the user may sever the secure, persistent connection between the user app and the app provider system. FIGS. 7A and 7B illustrate different embodiments for the app provider system's failback mechanisms for handling communications when a user device is not connected to the app provider system.

Turning to FIG. 7A, a first node 120-1 and a second node 120-2 in an app provider system are shown. The nodes are similar to the nodes described above with respect to FIG. 6. FIG. 7A shows Alice's first user device 130 connected to the first node 120-1; while Bob's second user device 132 is shown as not being connected to the app provider system.

When Alice wants to communicate with Bob, her user device 130 transmits a communication to the first node 120-1 as illustrated in 710. As discussed above, the first reactor module 2280 receives the communication from Alice's user device 130 and begins processing it. Additionally, the communication is stored in the first incoming message queue 2250 in 720 and may distributed to other incoming message queues 2350 in 730. While the message is being stored in the incoming message queues, the reactor module 2280 may further process the communication; specifically, it determines whether one or more receiver devices are connected to the first node 120-1. As illustrated in FIG. 7A, Bob is not connected to the app provider system. Accordingly, the reactor module 2280 determines that Bob, one of the receivers of Alice's communication, is not connected to the same node as the sender. In this regard, the first reactor module 2280 transmits the communication to the first processor module 2270, which will handle delivery of Alice's communication.

As noted above, the first processor module 2270 determines receiver information and uses information contained in the distributed routing table to determine if Bob's device 132 is connected to the app provider system. Accordingly, the first processor module will determine that Bob's device 132 is not connected to the app provider system. Instead, the first processor module 2270 may determine which node Bob's user queue is located on from the information contained in the distributed routing table. According to some embodiments, a user's user queue does not have to be located on the same node that the user's device connects to when accessing the app provider system. In 750, the first processor module 2270 will forward the communication to the reactor module on the node in which the user's user queue is located. As illustrated in FIG. 7A, the first processor module 2270 forwards the communication to reactor module 2380 on node 120-2. The first processor module 2270 may also include an indication that the communication is intended for a user that is not connected to the app provider system so that the second node avoids repeating the determining steps already performed by the first node. Upon receiving the communication, the reactor module 2380 may publish an entry to Bob's user queue. As illustrated in FIG. 7A, the reactor module 2380 adds an entry to Bob's user queue 2360-0. According to some embodiments, Bob's user queue 2360-0 includes a pointer 2362. The pointer may be incremented each time an entry is published to the user queue. In this regard, the pointer 2362 may be used to keep track of the entries added since a user last connected to the app provider system. When the user (e.g., Bob) reconnects to the app provider system, the pointer may be used to flush the notifications from the user queue. For instance, if Bob receives four notifications while disconnected from the app provider system, the pointer refers to the first notification received after Bob disconnected from the app provider system. When Bob reconnects to the app provider system, that first communication, along with the three communications received thereafter, will be pushed to the app located on Bob's user device. According to some embodiments, the pointer 2362 may be able to replay messages. That is, the pointer may be able to go backwards through a user's user queue to push communications that have been previously delivered to a user device. This may be used to restore communications that have been previously lost or when a user acquires a new device.

Turning to FIG. 7B, an alternative approach for handling communications when a user device is not connected to the app provider system is shown. In this regard, FIG. 7B shows an app provider system with a first node 120-1, a second node 120-2, a third node 120-3, a fourth node 120-4, a fifth node 120-5, and a sixth node **120-*n*. Additionally, FIG. 7B includes a third party notification system 150. Like FIG. 7A, Alice's user device 130 is connected to the first node 120-1 and Bob's user device 132** is disconnected from the app provider system.

As with previous examples, when Alice wants to communicate with Bob, she composes a communication and her user device 130 transmits it the first node 120-1 for delivery to Bob's device 132 as illustrated in 710. In 720, the communication is stored in the incoming message queue. Further, the communication may be distributed to the incoming message queue located on other nodes in the app provider system in 730. The reactor module 2280 determines whether Bob is connected to the first node 120-1 while the communication is being stored. Since Bob is not connected to the app provider system in FIG. 7B, the reactor module 2280 determines that Bob is not connected to the same node as the sender and passes the communication to the first processor module 2270. In this regard, the first processor module 2270 uses information contained in the distributed routing table to determine if Bob's device 132 is connected to the app provider system. Based on the example in FIG. 7B, the first processor module 2270 determines Bob's device 132 is not connected to the app provider system.

According to the embodiment illustrated in FIG. 7B, the first processor module 2270 relies on the third party notification system 150 to provide notification and delivery of the communication to the receiver's user device. In block 760, the first processor module 2270 packages the communication and transmits the communication to the third party notification system. As noted above, a user registers an app with a third party notification when configuring which notifications they would like to receive. In response to this registration, the third party notification system provides the app a unique device token that the third party notification system will use to provide notifications and communications to the app. Accordingly, the app will provide the unique device token to the app provider system so the app provider system may deliver notifications and communications via the third-party notification system. In this regard, packaging the communication may include combining the receiver's unique device token and the communication in a datagram that is transmitted to the third party notification system. If the receiver has more than one device, then the unique device token associated with each of the users' devices are included in the package transmitted to the third party notification system. Returning to the example shown in FIG. 7B, the first processor module 2270 transmits a unique device token and Alice's communication to the third party notification system 150 in 760. Accordingly, the third party notification system will deliver the notification and the communication to Bob's device 132 in due course.

Figure 8:
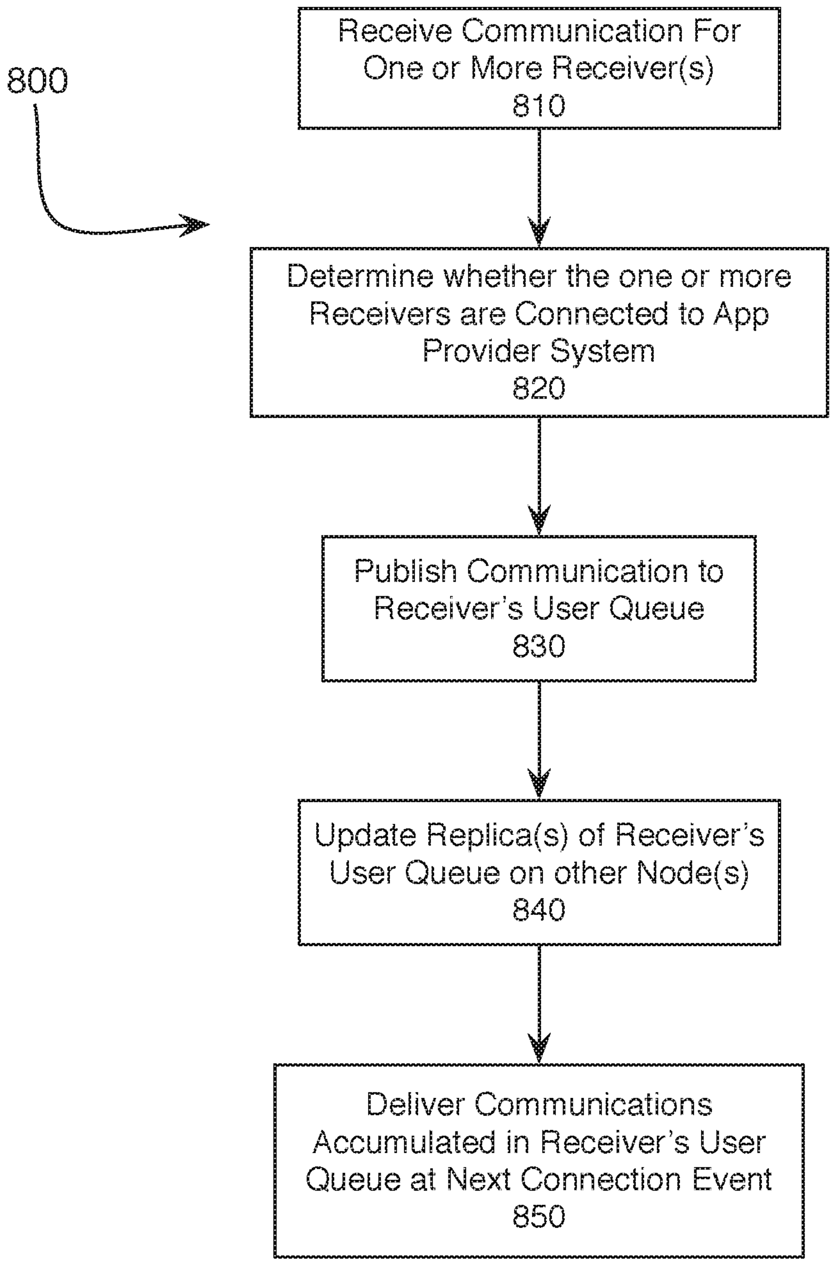
FIG. 8 illustrates an exemplary process for handling communications without the use of a third-party push token.

FIG. 8 illustrates an exemplary process 800 for handling communications without the use of a push token provided by a third-party notification system. Process 800 begins in block 810 when the app provider system receives a communication for one or more receivers. In block 820, the app provider system determines whether the one or more receiver devices are connected to the app provider system. As discussed above, there are several techniques for the app provider system to determine whether the one or more receiver devices are connected to the app provider system. After determining that the one or more receiver devices are not connected to the app provider system, the app provider system publishes the communication to the one or more receivers' user queues in block 830. For example, the communication may be directed to a node in the app provider system that includes the user's user queue. The reactor module will receive the incoming communication and publish it to the respective user's user queue. In block 840, the app provider system updates replicas of the one or more receiver's user queues on other nodes in the app provider system. In this regard, each node in the app provider system includes replication information for at least one other node in the app provider system, including user queues. Accordingly, when the primary user queue is updated, the replicated user queues are updated to mirror the information contained in the primary user queue. In block 850, the app provider system delivers communications published to the one or more receivers' user queues during the next connection event. That is, the next time that the user device connects to the app provider system, the notifications and/or messages received by the app provider system while the user was disconnected will be delivered to the user's device.

Figure 9:
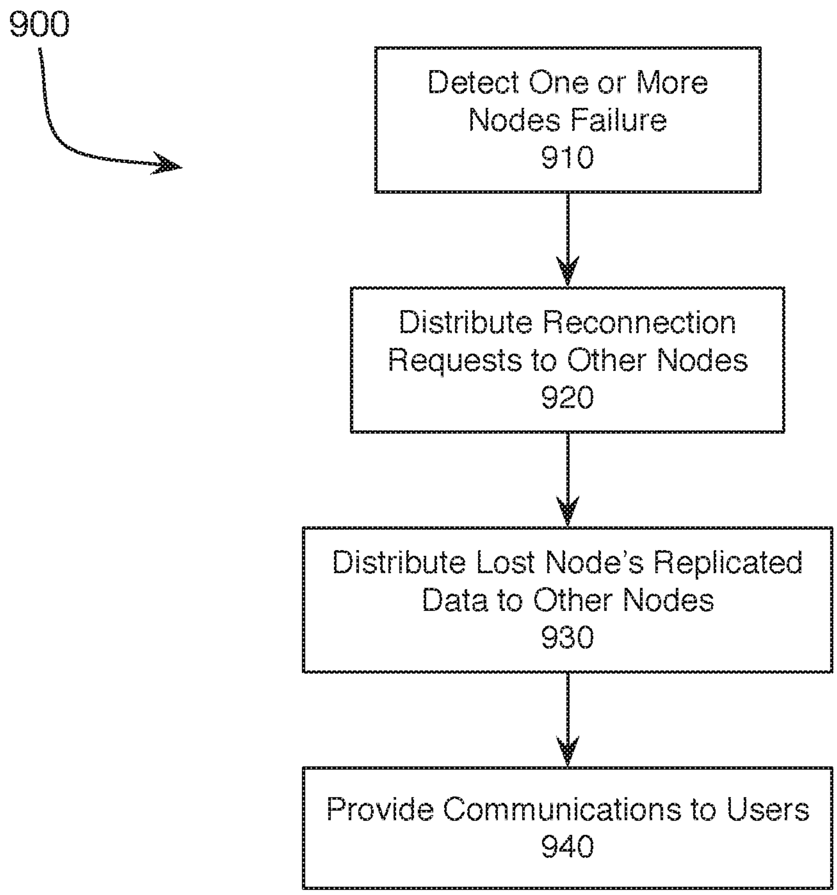
FIG. 9 shows an exemplary process for handling a node failure in the app provider system.

As communications increase, nodes in the app provider system may fail. Such failures may be catastrophic for the app provider system. In addition to being a disruption of service, users may lose communications. Those two factors may deter users from downloading the app provider's app. In this regard, there is a need for nodes in the app provider system to fail that minimizes disruption of service and ensures that communications are not lost. FIG. 9 shows an exemplary process 900 for handling a node failure in the app provider system.

In block 910, the app provider system detects a node failure. In this regard, the other nodes in a system may detect that one or more nodes have failed. For example, nodes may transmit a heartbeat signal to indicate their presence. When the heartbeat signal is not detected, the other nodes may determine that the node has been lost. Alternatively, one or more nodes may be designated to periodically poll other nodes to determine their state. According to some embodiments, the load balancer may be responsible for determining node availability, including when one or more nodes fail.

When a node fails, the users that were connected to that node will attempt to reconnect to the app provider system. In block 920, the load balancer distributes reconnection requests to other nodes in the app provider system. As noted above, each node in the app provider system may include replication information of at least one other node. In block 930, the failed node's replication data is distributed to other nodes. This distribution may be equitable with each remaining node in the app provider system receiving a portion of the failed node's replication data. Alternatively, the app provider system may transfer the failed node's replication data to a single node, or several nodes, that assume the failed node's workload.

In block 940, the app provider system provides communications received for users that were disconnected from the app provider system when the node failed. In various embodiments, communications received after the node failed but before the user reconnected would accumulate in the user's user queue as discussed above with respect to FIG. 7A. When the user reconnects, a reconnection event is detected and the communications published to the user's user queue may be pushed to the reconnected device. Alternatively, the app provider system may rely on the third-party notification system as discussed above. According to this example, the third-party notification system would provide delivery of any notifications and/or communications on behalf of the app provider system.

Figure 10A:
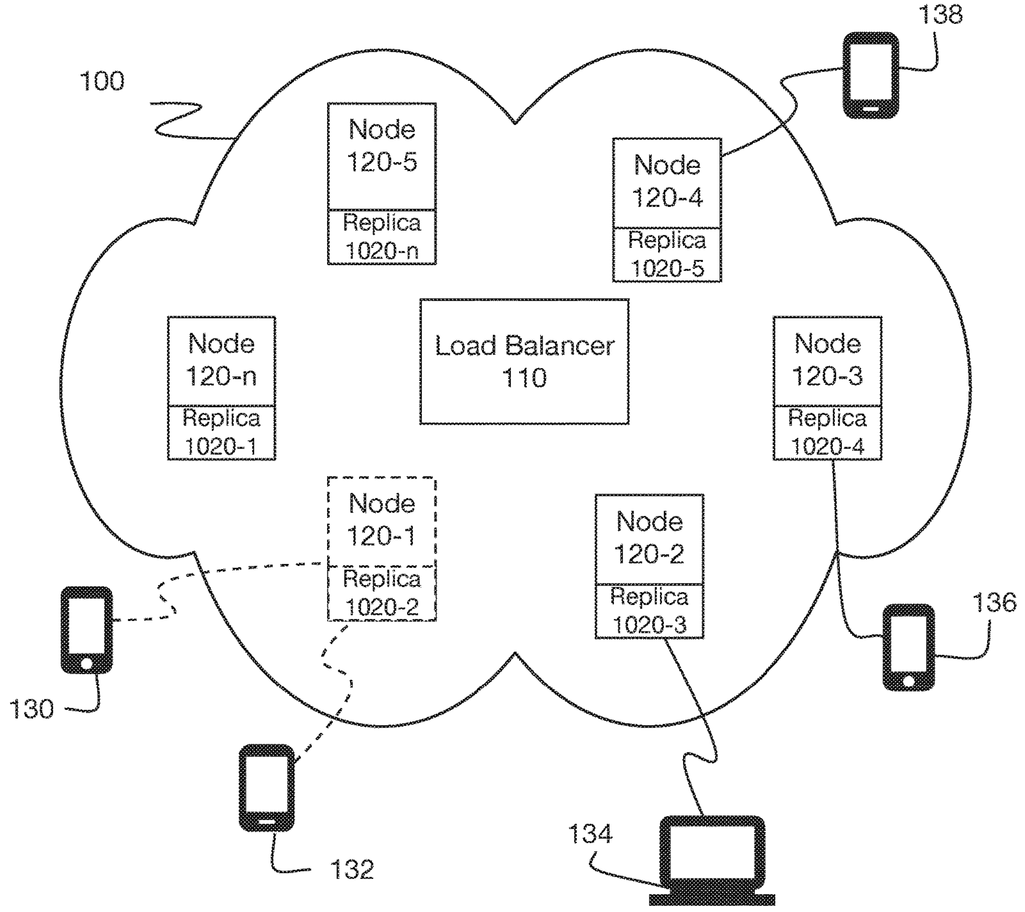
FIGS. 10A and 10B illustrates an example of the app provider system handling a node failure.
Figure 10B:
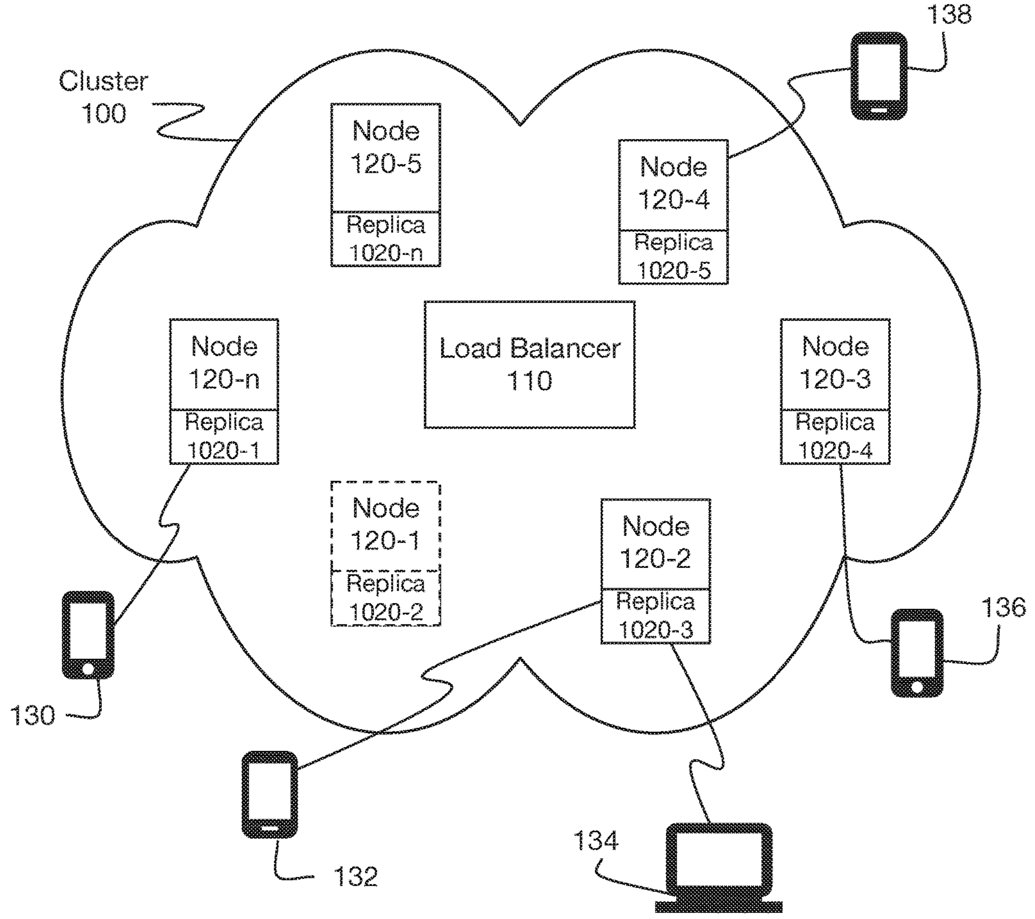

Turning to FIGS. 10A and 10B, an example of the app provider system handling a failed node is illustrated. The app provider system illustrated in FIGS. 10A and 10B is similar to the one described above with respect to FIG. 1. In this regard, the app provider system 100 includes a load balancer 110 and six nodes: a first node 120-1, a second 120-2, a third node 120-3, a fourth node 120-4, a fifth node 120-5, and a sixth node ($n^{th}$ node) **120-*n*. FIG. 10A shows that a first client device 130 and a second client device 132 are connected to node 120-1; a third client device 134 is connected to node 120-2; a fourth client device 136 is connected to node 120-3; and a fifth client device 138 is connected to node 120-4**.

FIGS. 10A and 10B also illustrate that every node in the app provider system includes replication information from at least one other node. For example, the first node 120-1 stores replication information 1020-2 for the second node 120-2; the second node 120-2 maintains replication information 1020-3 for the third node 120-3; the third node 1020-3 stores replication information 1020-4 for the fourth node 120-4; the fourth node 120-4 stores replication information 1020-5 for the fifth node 120-5; the fifth node 120-5 stores replication information **1020-*n* for the nth node 120-*n*; and the sixth node 120-*n* stores replication information 1020-1 for the first node 120-1. While FIGS. 10A and 10B illustrate one node being replicated on another node, replication information may be spread across several nodes. For instance, the replication information 1020-1 may be stored on multiple nodes, such as the sixth node 120-*n* and second node 120-2**. The replication information may include configuration information. For instance, the replication information may include copies of the node's reactor module, processor module, plurality of user queues, and incoming message queue. Accordingly, the replication information may be updated regularly to reflect the state of the node. Since user information and communications are replicated across other nodes in near real-time, that information will not be lost in the event of a node failure.

Returning to FIG. 10A, the first client device 130 and the second client device 132 are shown as being connected to first node 120-1. However, first node 120-1 fails and the connections between the first client device 130 and the second client device 132 are terminated, as indicated by the broken lines. As noted above, the first client device 130 and the second client device 132 will attempt to reconnect to the app provider system. In this regard, both devices will reconnect via the load balancer, which will distribute the first client device 130 and the second client device 132 to other nodes in the system.

FIG. 10B shows the first client device 130 and the second client device 132 reconnected to the app provider system after the failure of the first node 120-1. Specifically, the first client device 130 reconnects to the sixth node **120-*n* and the second client device 132 reconnects to the second node 120-2. As noted above, the app provider system will detect a connection event for both the first user device 130 and the second user device 132. In response to detecting the connection event, the app provider system will deliver notifications and/or communications to the first and second user devices. According to some embodiments, the replication information 1020-1 on sixth node 120-*n* would include user queues for both the first client device 130 and the second client device 132. In this regard, the notifications and/or communications contained in the user queues stored in the replication information 1020-1 will be pushed to the first user device 130 and the second user device 132. In alternative embodiments, user queues for the first and second user devices may have been located on nodes other than the node that failed. According to these embodiments, the notifications and/or communications may be routed from the user's user queue to the user device via the node that the user device reconnected to. For example, the second user device's user queue may be located on the third node 120-3. When the second user device reconnects to the app provider system, the second user device's notifications and/or communications will be routed through the second node 120-2 as they are being delivered to the second user device 132**.

Figure 11:
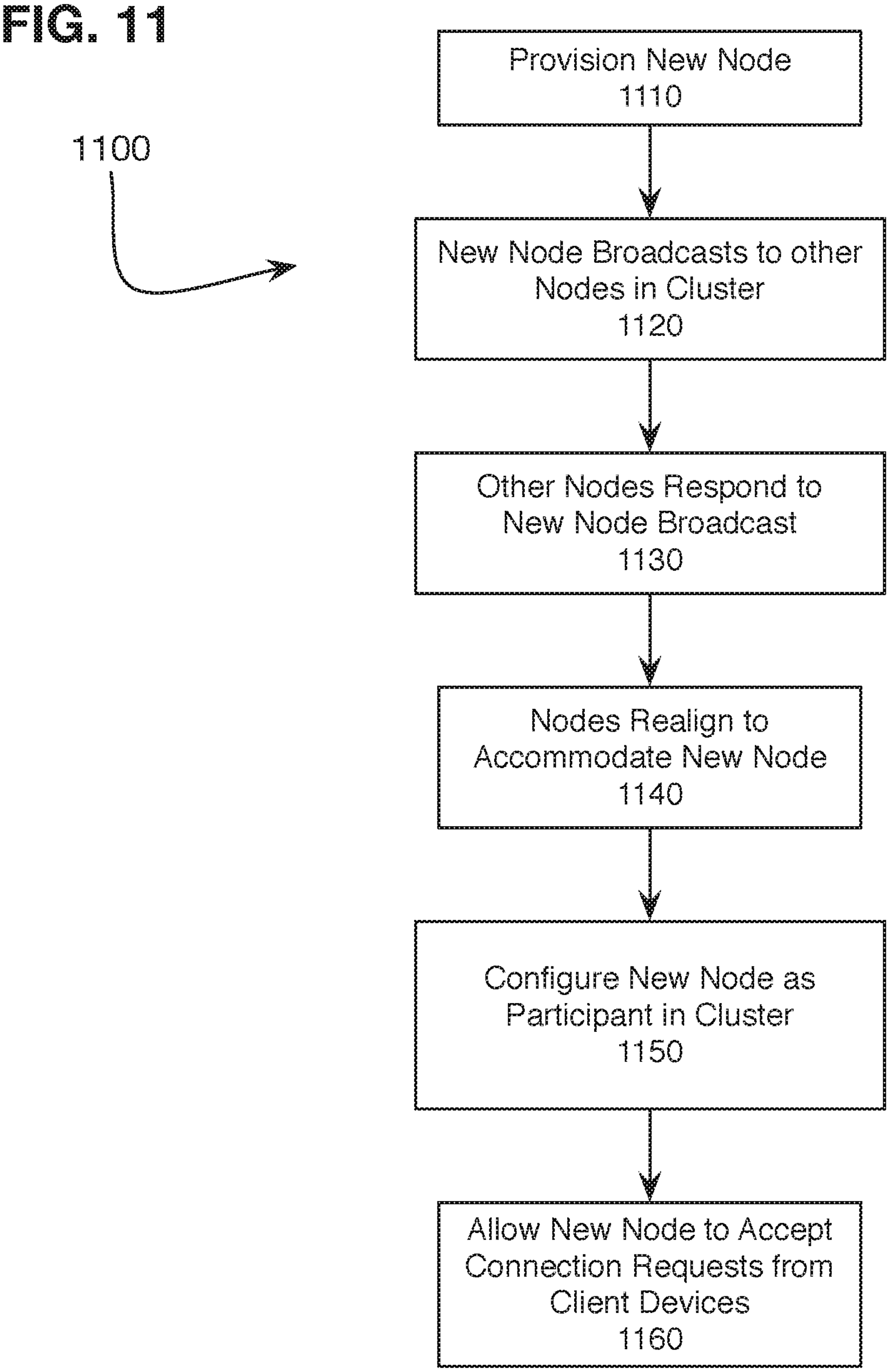
FIG. 11 shows a process for provisioning a new node in an app provider system.

The app provider system may need to occasionally provision a new node, for example, in response to a failed node or due to an increase in network traffic. FIG. 11 shows a process 1100 for provisioning a new node.

In block 1110, the app provider system provisions a new node. According to some embodiments, provisioning a new node may include requesting additional resources from a cloud service provider. These additional resources may include, for example, an additional virtual machine, more processing power, more memory, additional bandwidth, etc. In other embodiments, provisioning a new node may mean adding an additional server to the app provider system.

In block 1120, the new node broadcasts to the other nodes in the cluster. That is, the new node broadcasts a communication to the other nodes in the system to determine the overall configuration of the app provider system. In block 1130, the other nodes respond to the new node's broadcast. The response may include configuration information, geographic location, workload, and any other pertinent information for the new node. The new node receives the responses from the other nodes in the system. In block 1140, the nodes in the app provider system realign to accommodate the new node. Realignment may include redistributing user queues and the incoming message queue. Once the other nodes have realigned to accommodate the new node, the new node is configured as a participant in the cluster in block 1150. Configuring the new node may be done by at least one other node. In this regard, the new node receives copies of the reactor module, the processor module, the plurality of user queues, and the incoming message queue. Additionally, the new node's configuration may include receiving replication information for at least one other node in the app provider system. Once the new node is configured, the app provider system will allow the new node to accept connection requests from client devices in block 1160.

Figure 12A:
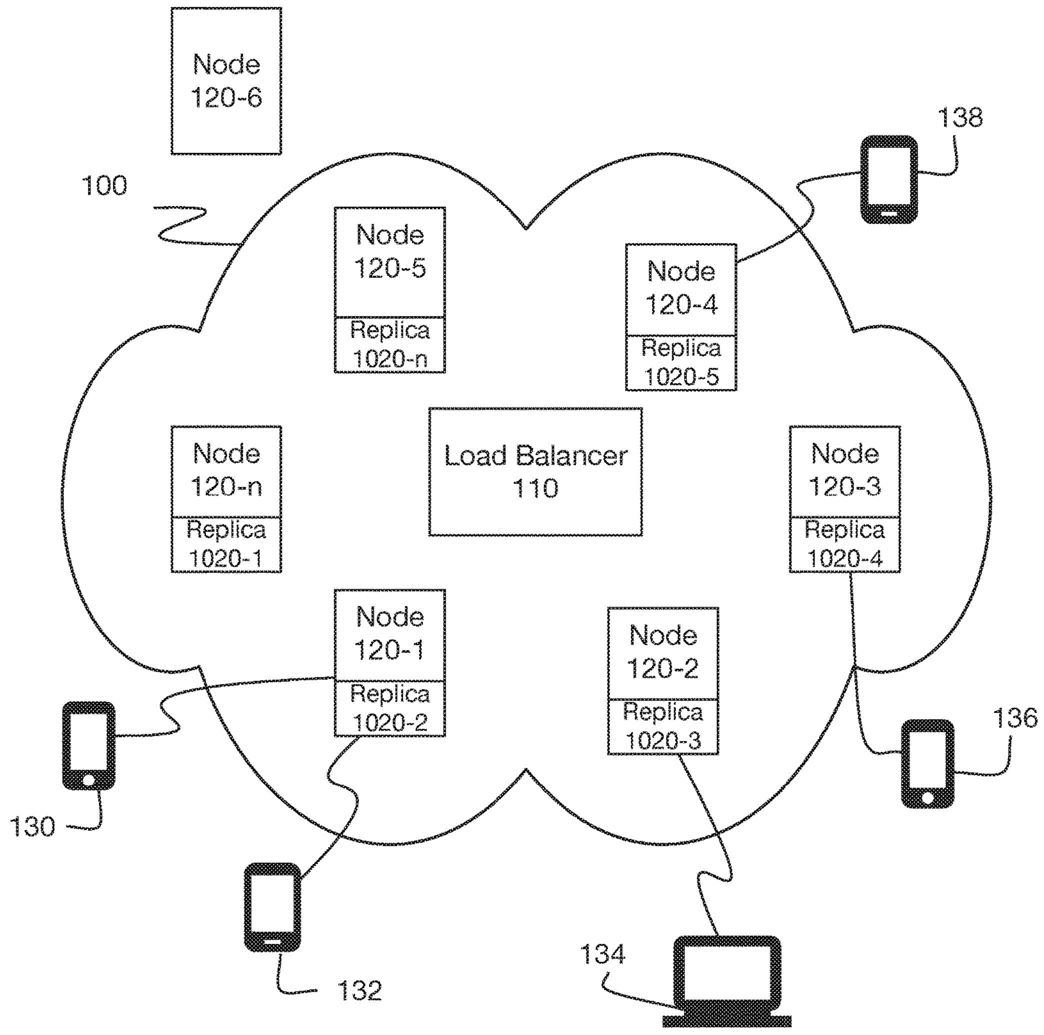
FIGS. 12A and 12B show an example of the app provider system provisioning a new node.
Figure 12B:
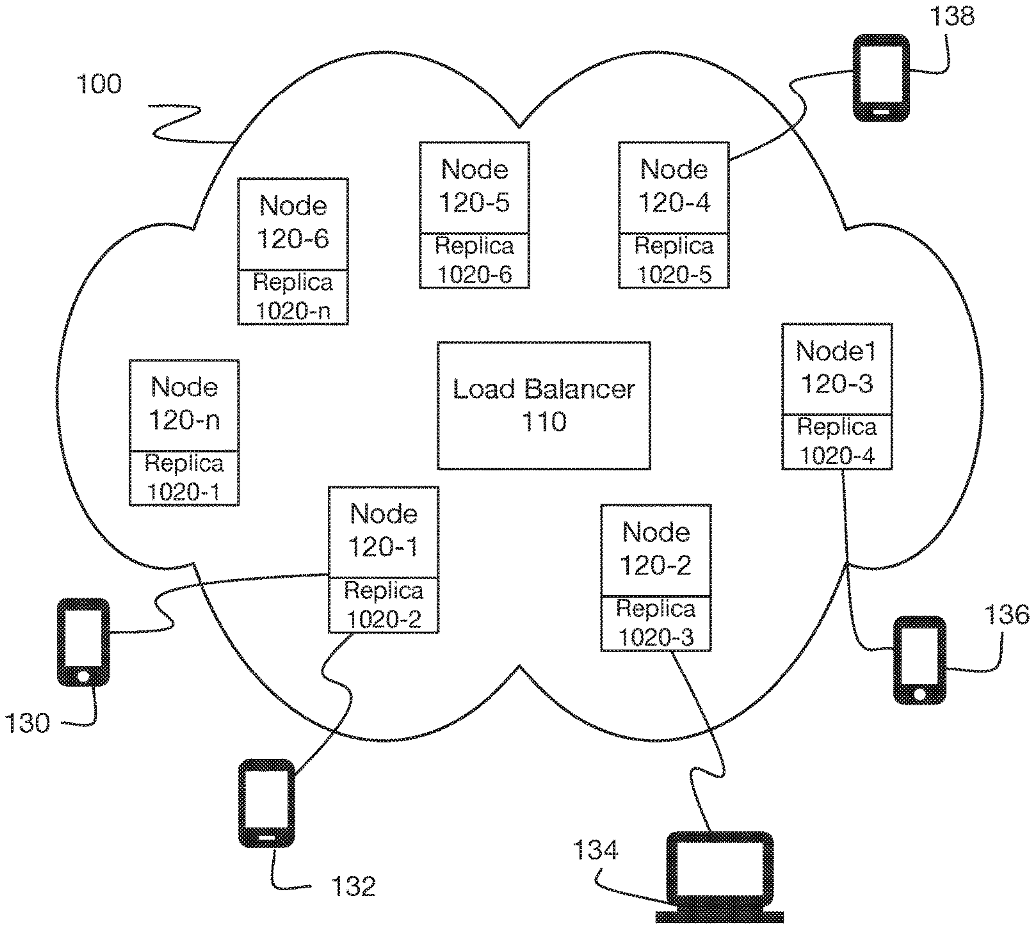

Turning to FIGS. 12A and 12B, an example of the app provider system provisioning a new node is shown. The app provider system shown in FIGS. 12A and 12B is similar to those described in FIGS. 1, 10A, and 10B and includes a load balancer 110 and six nodes: a first node 120-1, a second node 120-2, a third node 120-3, a fourth node 120-4, a fifth node 120-5, and a sixth node ($n^{th}$ node) **120-*n*. Further, FIGS. 12A and 12B show a first client device 130 and a second client device 132 connected to first node 120-1; a third client device 134 connected to second node 120-2; a fourth client device 136 connected to third node 120-3; and a fifth client device 138 connected to node fourth 120-4**.

FIG. 12A also illustrates a seventh node 120-6 that is not part of the app provider system yet. When the app provider system needs another node, it implements the process described above in FIG. 11. Specifically, the app provider system requests an additional node, for example, in response to determining that traffic on the app provider system has increased or detecting that at least one node in the app provider system has failed. Accordingly, the seventh node 120-6 may be allocated to app provider system 100 as illustrated in FIG. 12B. After becoming part of the app provider system 100, the seventh node 120-6 broadcasts a communication to the other nodes in the system to determine the overall configuration of the app provider system. After receiving a response from the other nodes in the system, the seventh node 120-6 will receive configuration information. As illustrated in FIG. 12B, part of the configuration information the seventh node 120-6 receives includes replication information **1020-*n*. In this regard, the replication information may be redistributed amongst the plurality of nodes in the app provider system. FIG. 12B also illustrates how the existing nodes in the app provider system realign to accommodate the new node. After the node is configured, the load balancer 110 will begin directing connection requests to the seventh node 120-6** to redistribute the load on the app provider system.

The above-described embodiments disclose a system and method that provide an app provider the ability to deliver information without the use of a push token provided by a third-party notification service. Further, various embodiments describe the flexibility of the app provider system to handle node failures and the provisioning of additional nodes. While the foregoing embodiments have been described in some detail for purposes of clarity of understanding, the present disclosure is not limited to the details provided. There are many alternative ways of implementing the present disclosure. The disclosed embodiments should be construed as being illustrative and not restrictive.

What is claimed is:

1. A system, comprising:

a hardware processor configured to:

receive, at one of a plurality of nodes in a system, a connection request from a first client device, wherein the connection request includes authentication information;

determine whether the first client device has previously connected to the system;

when the first client device has not previously connected to the system, authenticate the first client device using the authentication information contained in the connection request;

after the first client device is authenticated, generate an ephemeral identifier for the first client device by concatenating a node identifier with hashed identifying information of the first client device, wherein the node identifier uniquely identifies the node to which the first client device is connected to amongst the plurality of nodes in the system;

bind the first client device to the generated ephemeral identifier; and create an entry in a distributed routing table for the first client device that includes the ephemeral identifier;

provide the entry to the plurality of nodes in the system to update the distributed routing table located on each of the plurality of nodes;

maintain an incoming message queue to store one or more communications received from a plurality of second client devices; and deliver, via a secure channel, a first communication from the incoming message queue to the first client device based on the entry for the first client device in the distributed routing table; and a memory coupled to the hardware processor and configured to provide the hardware processor with instructions.

2. The system of claim 1, wherein the authentication information includes a username and password.

3. The system of claim 2, wherein the hardware processor is further configured to:

compare the username and password received from the first client device to a username and password maintained by the system.

4. The system of claim 1, wherein the authentication information includes a blob of data indicating that the password entered by the user on the first client device matches the password stored locally on the device.

5. The system of claim 1, wherein the secure channel is established when the first client device is successfully authenticated.

6. A method comprising:

receiving, at one of a plurality of nodes in a system, a connection request from a first client device, wherein the connection request includes authentication information;

determining, by one of a plurality of nodes in a system, whether the first client device has previously connected to the system;

when the first client device has not previously connected to the system, authenticating the first client device using the authentication information contained in the connection request;

after the first client device is authenticated, generating an ephemeral identifier for the first client device by concatenating a node identifier with hashed identifying information of the first client device, wherein the node identifier uniquely identifies the node to which the first client device is connected to amongst the plurality of nodes in the system;

binding the first client device to the generated ephemeral identifier;

creating an entry in a distributed routing table for the first client device that includes the ephemeral identifier;

providing the entry to the plurality of nodes in the system to update the distributed routing table located on each of the plurality of nodes;

maintaining an incoming message queue to store one or more communications received from a plurality of second client devices; and delivering, via a secure channel, a first communication from the incoming message queue to the first client device based on the entry for the first client device in the distributed routing table.

7. The method of claim 6, wherein the authentication information includes a username and password.

8. The method of claim 7, further comprising:

comparing the username and password received from the first client device to a username and password maintained by the system.

9. The method of claim 6, wherein the authentication information includes a blob of data indicating that the password entered by the user on the first client device matches the password stored locally on the device.

10. The method of claim 6, wherein the secure channel is established when the first client device is successfully authenticated.

11. A non-transitory computer-readable medium comprising instructions that when, executed by at least one hardware processor, perform the steps of:

receiving, at one of a plurality of nodes in a system, a connection request from a first client device, wherein the connection request includes authentication information;

determining whether the first client device has previously connected to the system;

when the first client device has not previously connected to the system, authenticating the first client device using the authentication information contained in the connection request;

after the first client device is authenticated, generating an ephemeral identifier for the first client device by concatenating a node identifier with hashed identifying information of the first client device, wherein the node identifier uniquely identifies the node to which the first client device is connected to amongst the plurality of nodes in the system;

binding the first client device to the generated ephemeral identifier; and creating an entry in a distributed routing table for the first client device that includes the ephemeral identifier;

providing the entry to the plurality of nodes in the system to update the distributed routing table located on each of the plurality of nodes;

maintaining an incoming message queue to store one or more communications received from a plurality of second client devices; and delivering, via a secure channel, a first communication from the incoming message queue to the first client device based on the entry for the first client device in the distributed routing table.

12. The non-transitory computer-readable medium of claim 11, wherein the authentication information includes a username and password.

13. The non-transitory computer-readable medium of claim 12, further comprising instructions for:

comparing the username and password received from the first client device to a username and password maintained by the system.

14. The non-transitory computer-readable medium of claim 11, wherein the authentication information includes a blob of data indicating that the password entered by the user on the first client device matches the password stored locally on the device.

15. The non-transitory computer-readable medium of claim 11, wherein the secure channel is established when the first client device is successfully authenticated.

* * * * *